Feb. 13, 1934.   S. BRAND   1,946,469
CASH REGISTER
Filed March 22, 1930   7 Sheets-Sheet 1

Inventor
Samuel Brand
By  Earl Beust
His Attorney

Feb. 13, 1934.  S. BRAND  1,946,469

CASH REGISTER

Filed March 22, 1930  7 Sheets-Sheet 2

Inventor
Samuel Brand
By Carl Beust
His Attorney

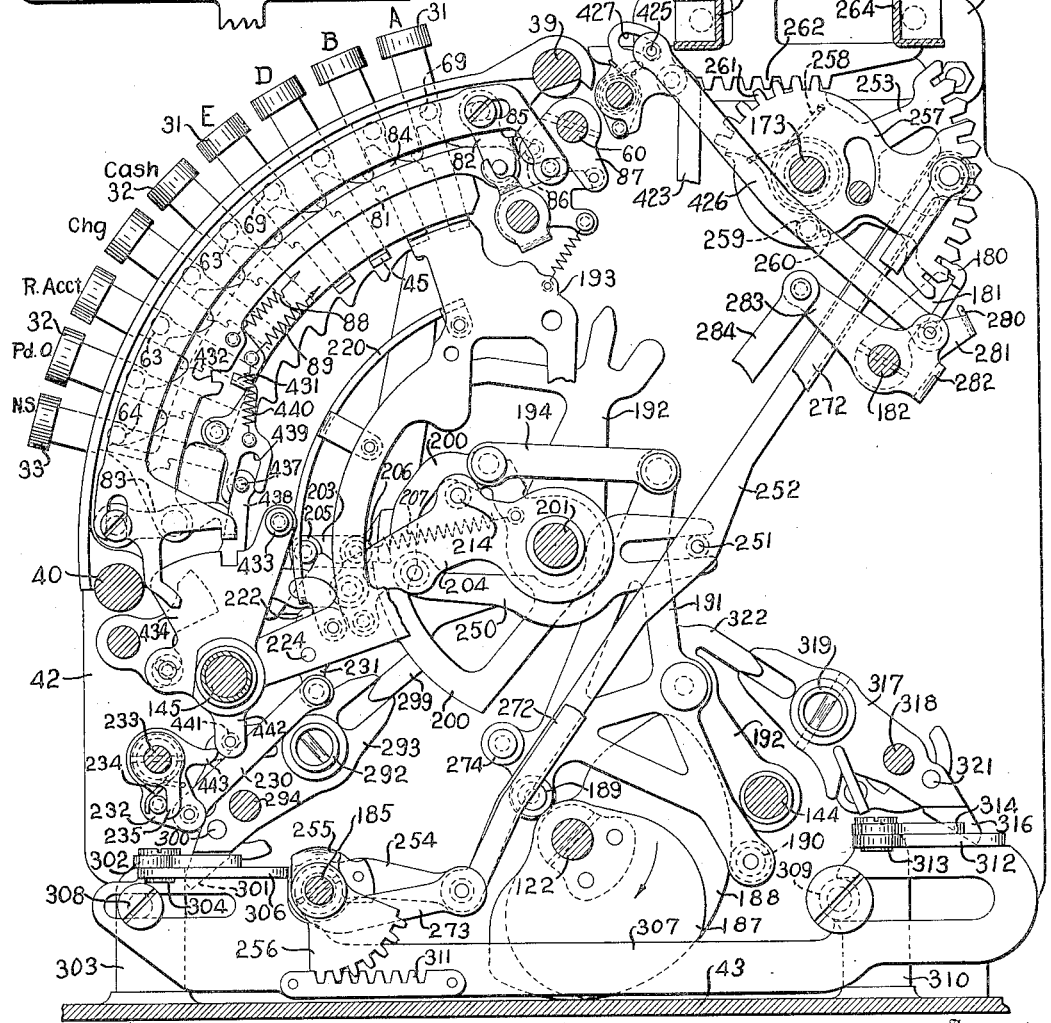

Feb. 13, 1934.  S. BRAND  1,946,469
CASH REGISTER
Filed March 22, 1930  7 Sheets-Sheet 4
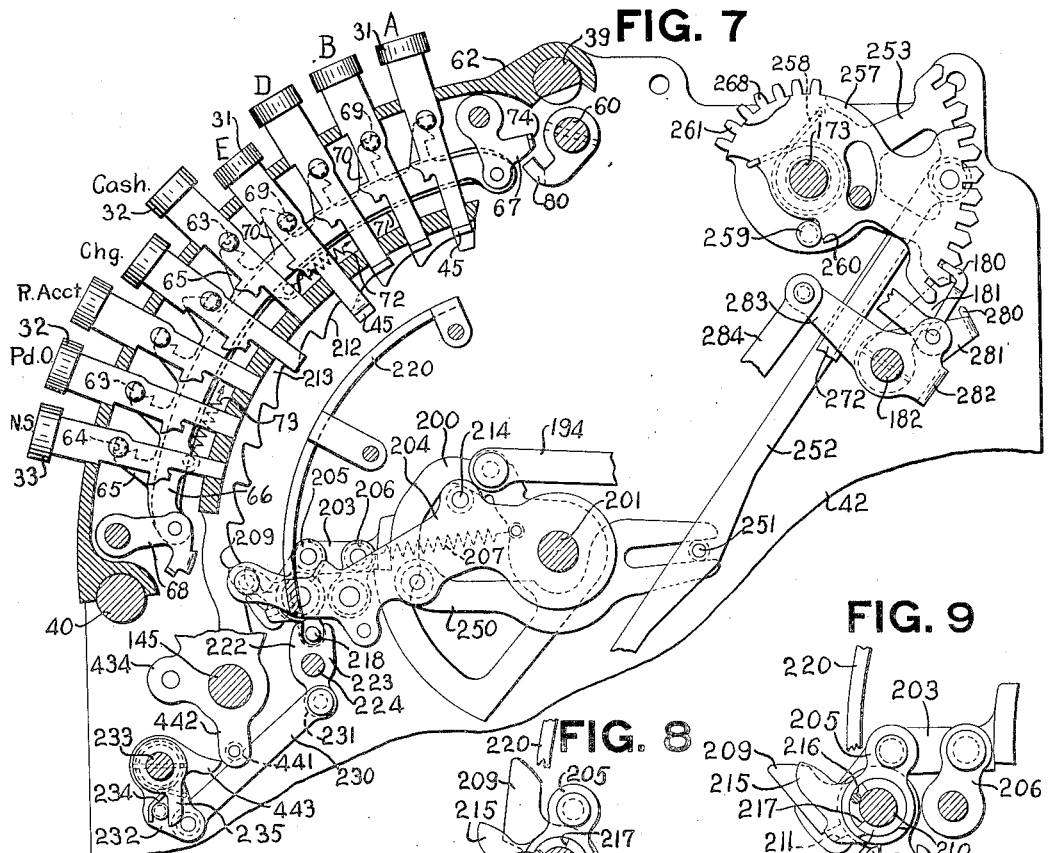
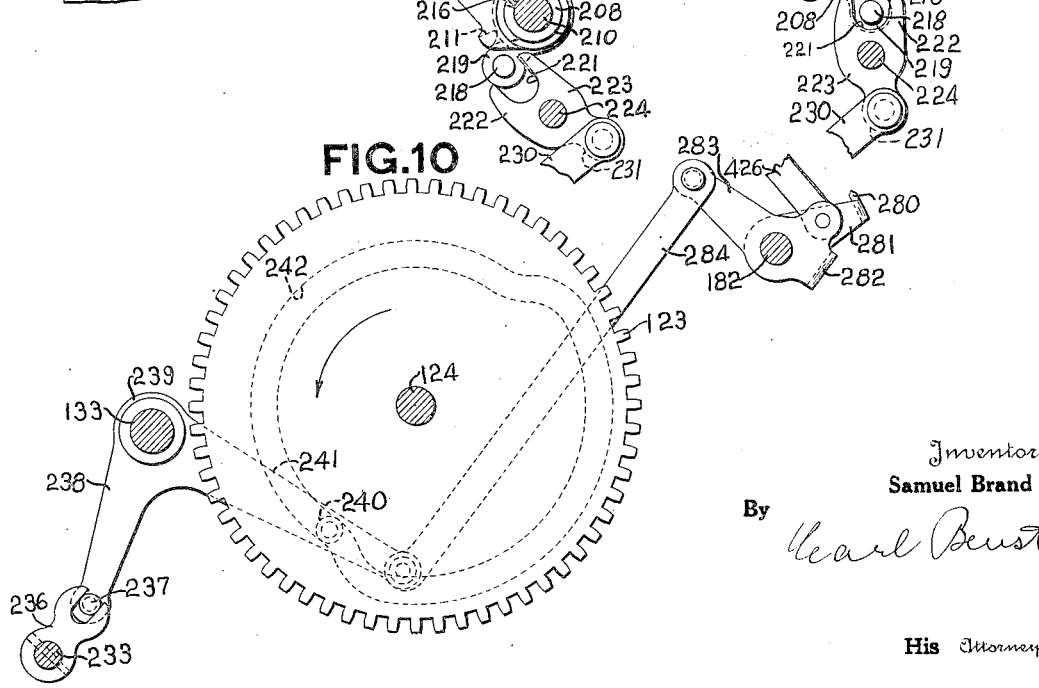
Inventor
Samuel Brand
By
His Attorney Feb. 13, 1934. S. BRAND 1,946,469
CASH REGISTER
Filed March 22, 1930 7 Sheets-Sheet 5
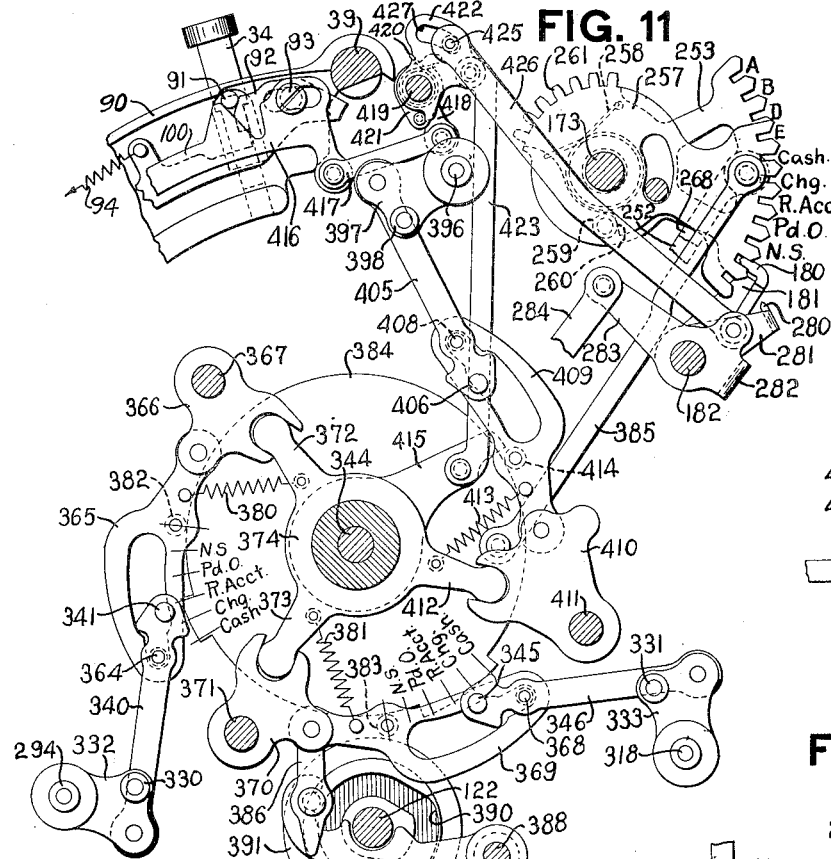
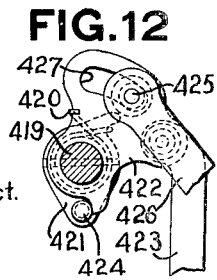
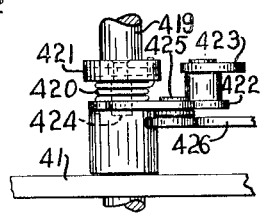
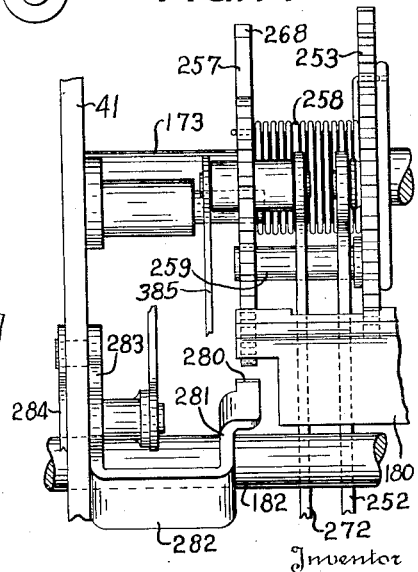
Inventor
Samuel Brand
By *Karl Benst*
His Attorney Feb. 13, 1934.     S. BRAND     1,946,469
CASH REGISTER
Filed March 22, 1930     7 Sheets-Sheet 6

Inventor
Samuel Brand
By
Earl Beust

His Attorney

Feb. 13, 1934.  S. BRAND  1,946,469
CASH REGISTER
Filed March 22, 1930  7 Sheets-Sheet 7

Inventor
Samuel Brand
By
His Attorney

Patented Feb. 13, 1934

1,946,469

UNITED STATES PATENT OFFICE 1,946,469

CASH REGISTER

Samuel Brand, Dayton, Ohio, assignor to The National Cash Register Company, Dayton, Ohio, a corporation of Maryland Application March 22, 1930. Serial No. 438,208

41 Claims. (Cl. 235—7)

This invention relates to cash registers and the like and particularly refers to machines of the type illustrated and described in Letters Patent of the United States, Nos. 1,817,883 and 1,865,147 issued to B. M. Shipley on August 4, 1931, and June 28, 1932 respectively, and No. 1,839,371, issued to Samuel Brand on January 5, 1932.

The machines disclosed in the above mentioned patents are of the same general type as the machines disclosed in Letters Patent of the United States No. 1,242,170 issued to F. L. Fuller, October 9, 1917, and No. 1,619,796 issued to B. M. Shipley, March 1, 1927.

One object of this invention is to provide a machine of the type disclosed in the above mentioned patents with a novel differential mechanism controlled by a divided bank of keys, the differential mechanism being given two excursions at each operation of the machine and being stopped on one excursion at one key position and on the other excursion at another key position.

Another object is to provide novel totalizer selecting means whereby an amount is accumulated on two totalizers selected under the control of two keys depressed in the same bank at a single operation of the machine.

Another object is to provide a machine of the type indicated with novel means to set a plurality of sets of indicators to different positions by a single differential in such a manner that the indicators are adjusted at different times during a single operation of the machine, both indicators being maintained in their adjusted positions at the end of the operation.

Still another object is to provide a novel latch mechanism to stop the differential at different positions during a single operation of the machine.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In said drawings:

Fig. 4 is a detail view of the clerk indicators.

Fig. 5 is a sectional view taken to the right of the divided bank of keys and including a differential mechanism, indicators and totalizer selecting mechanism associated with the clerk and transaction keys.

Fig. 6 is a fragmentary top plan view partly in section of the double latch arm mechanism.

Fig. 7 is a detail view of the transaction differential and the part of the mechanism adjusted thereby.

Fig. 8 is a detail view of the latch arm positioned to disconnect the latch on one of the keys in the upper or clerk group.

Fig. 9 is a detail view of the latch arm in position to disconnect the latch on one of the keys in the lower or transaction group.

Fig. 10 shows a special transaction indicator aliner and the latch arm control cam.

Fig. 11 shows the mechanism whereby the item totalizer is controlled by depression of the item key to engage the actuators but once at an operation of the machine.

Fig. 12 is a fragmentary view of the part of the mechanism shown in Fig. 11.

Fig. 13 is a top plan view of the mechanism shown in Fig. 12.

Fig. 14 is a fragmentary view in rear elevation of the indicator setting segment and the aliners therefor.

Fig. 15 shows the mechanism for locking the detent for the upper or clerk and the lower or transaction group of keys together by movement of the total control lever to one of its total or sub-total positions.

General description

Figure 1:
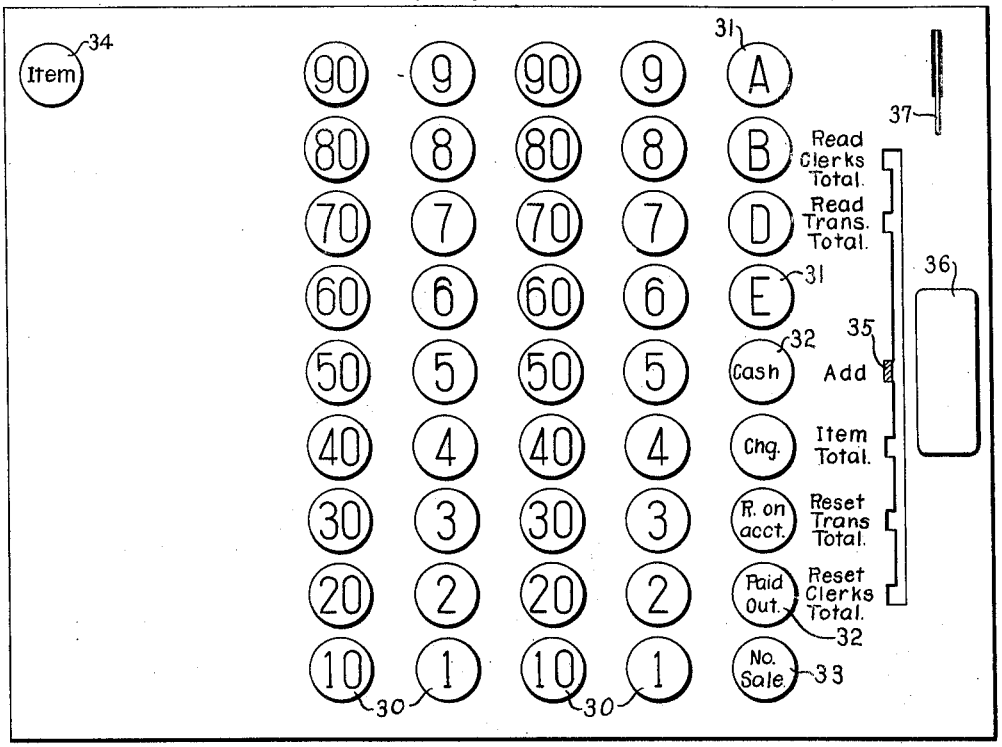
Fig. 1 is a diagrammatic view of the key board.

Described in general terms the machine to which the present invention is shown applied, includes a plurality of totalizers interspersed on three lines. One line, known herein as the "front line" carries four clerks' totalizers, another line known as the "back line" carries four transactions totalizers and a third line known as the "upper line" carries a single "item totalizer".

A plurality of banks of amount keys is provided to control the accumulation of amounts on the totalizer. The amounts are accumulated on the totalizers by differential mechanism similar to that disclosed in the above mentioned patents.

The totalizers on the front and back lines are selected under the control of a bank of keys known in the art as a divided bank. The keys of this bank are divided into two groups, the upper four keys being clerk keys and the remainder or the lower five keys being transaction keys. Both of these groups of keys control a single differential to select totalizers and set indicators and type wheels. A "no sale" key is included in the lower or transaction group of keys. This key does not control the selection of a totalizer but does control the setting of an indicator and printing mechanism.

The differential mechanism associated with the divided bank of keys is adapted to make two excursions at each adding operation of the machine instead of one, as in the machines of the above mentioned patents. This differential carries two latch arms instead of one as in prior machines of this type. One of the latch arms encounters the depressed key of the lower group at the first excursion, and is then withdrawn to permit the second latch arm to strike the depressed key in the upper group at the second excursion, thereby stopping the differential in a corresponding position.

The operating mechanism is essentially the same as that disclosed in the Shipley Patents Nos. 1,817,883 and 1,865,147. In the machine of these Shipley patents, however, the operating mechanism is arranged to stop the machine and to release the depressed keys except the clerks' and transaction keys, when the main drive shaft with which the machine is provided, has made one complete rotation.

The instant invention provides a mechanism to control the main drive shaft to make two complete rotations, hence adding operations really comprise two uninterrupted adding operations, during each of which a totalizer is selected first under the control of the depressed transaction key, and then under the control of the depressed clerks' key. The amount set up on the keyboard is added into each of the selected totalizers successively.

Two groups of indicators are also set by the single differential under the control of the groups of keys in the divided bank. An indicator in one group is selected and displayed during the first cycle of an adding operation. This indicator is alined and held in its adjusted position while, during the second adding cycle the same differential now under the control of the other group of keys in the divided bank selects and displays an indicator in another group.

Thus at the end of an adding operation the amount set up on the key board, the clerk's initial, and a symbol designating the nature of the transaction have been displayed and remain so displayed at the end of the operation, and until the next operation of the machine.

Printing mechanism, preferably of the type disclosed in the Shipley Patents Nos. 1,817,883 and 1,865,147, may be used in connection with the present invention, but as such printing mechanism forms no part of the present invention it is neither illustrated nor described herein.

Key board

The key board of the machine chosen for illustrative purposes is similar to that of the machine described in the above mentioned Shipley patents. In the present case, however, the clerk keys which on the previous machine of this type were located to the left of the main key board, are placed in the same bank or row with the transaction keys.

Figure 16:
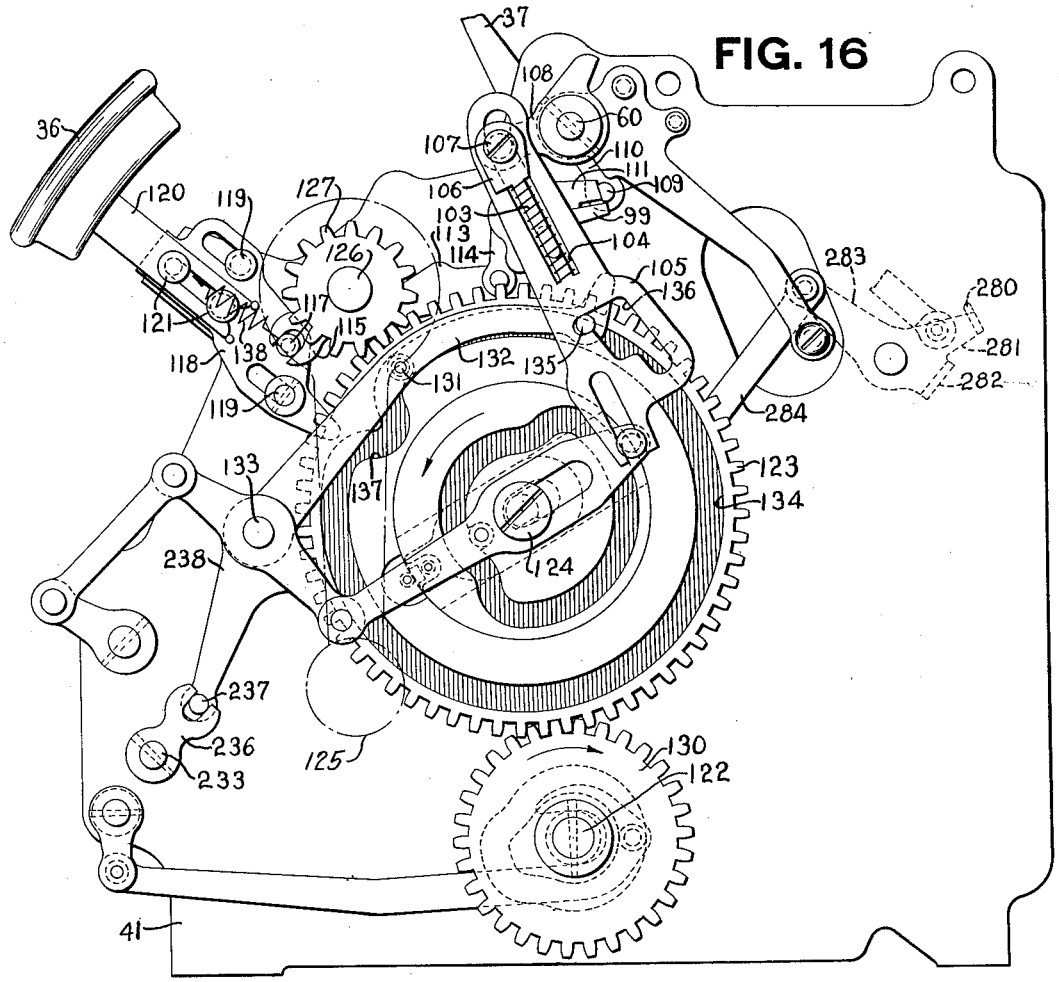
Fig. 16 is a view in right elevation of the machine showing the machine control mechanism.

The key board includes a plurality of banks of amount keys 30 (Figs. 1 and 2), a bank containing four clerk keys 31, four transaction keys 32, and a "no sale" key 33 (Figs. 1, 5, and 7), an item key 34, (Figs. 1 and 11), a total control lever 35 (Figs. 1 and 15), a release bar 36 (Figs. 1, 16 and 17) and a manually operated key release lever 37 (Figs. 1 and 16).

Key board-amount keys

Figure 2:
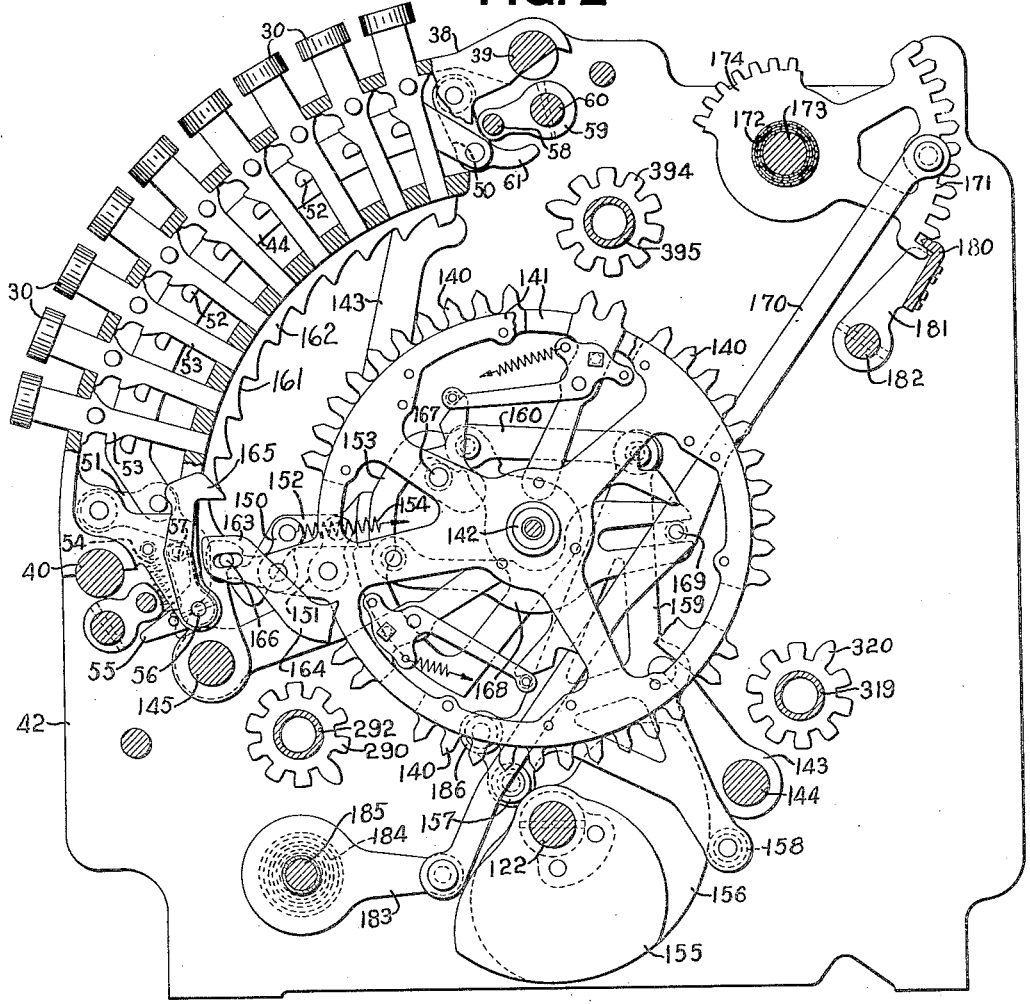
Fig. 2 is a sectional view taken through the machine to the right of one of the banks of amount keys showing also the differential mechanism associated with the amount bank.

The amount keys 30 (Fig. 2), of which a plurality of banks is provided, are slidably mounted in key frames 38 supported on cross rods 39 and 40 extending between machine side frames 41 and 42 (Figs. 2 and 16). Side frames 41 and 42 are suitably supported on a base 43 (Fig. 5) which, together with the side frames 41 and 42 form the main frame work of the machine.

A detent bar 44 (Fig. 2) having its upper end suitably supported on a link 50 and its lower end similarly supported on an arm 51 carries a series of flat sided studs 52, one to cooperate with a shoulder on the stem 53 of each of the keys 30 to restrain the depressed key in its depressed position. The arms 50 and 51 are pivotally supported in the key frame 38.

The detent bar 44 is held in its normal position (Fig. 2) by a spring 54 having one of its ends attached to one arm of a bell crank 55 fast on a short shaft 56 journaled in a projection of the key frame 38. The other arm of the bell crank 55 carries a stud held in contact with the lower side of the arm 51 by the spring 54.

Depression of one of the keys 30 shifts the detent bar 44 downwardly rocking the arm 51 clockwise, which, by the stud 57, rocks the bell crank 55 counter-clockwise against the tension of the spring 54. As soon as the shoulder on the key stem 53 passes the stud 52 the spring 54 rocks the bell crank 55 clockwise which, by the stud 57, rocks the arm 51 counter-clockwise raising the detent bar 44 to engage the stud 52 with the shoulder on the stem 53 of the particular key 30 depressed, thus restraining the key in its depressed position until near the end of the operation.

The depressed amount keys are all released near the end of the adding operation by again shifting the detent bar 44 downwardly. This is accomplished by a universal rod 58 carried by a plurality of arms 59 (only one being shown) fast on a release shaft 60 journaled in the frames 41 and 42. The shaft 60 must be rocked clockwise as will be described later to release the machine. At the proper time near the end of an operation, mechanism to be described later rocks the shaft 60 counter-clockwise engaging the rod 58 with tail 61 on the arm 50 supporting the upper end of the detent bar 44. Continued movement of the shaft 60 and rod 58 rocks the arms 50 clockwise to shift the detent bar 44 downwardly freeing the stud 52 from the shoulder on the stem 53 of the depressed key whereupon a key spring (not shown) restores the depressed key to its normal outer position.

Shaft 60 and rod 58 are then restored to their normal positions and the spring 54 restores the detent bar to its normal position.

*Key board-divided bank*

The keys of the divided bank are arranged in two groups namely the clerks keys 31 (Figs. 5 and 7), and transaction keys 32. The "no sale" key 33 is associated with the latter group for the purpose of releasing the machine for operation when no money is involved in the transaction. This key does not control the selection of a totalizer but does control the selection of an indicator. The "no sale" key 33 will therefore be considered in this specification in connection with the group of transaction keys.

The keys 31, 32, and 33 are slidably mounted in a key frame 62 (Figs. 5 and 7) supported on the cross rods 39 and 40. Each of the keys 32 carries a stud 63 and key 33 carries a stud 64 cooperating with shouldered projections 65 on a detent bar 66 pivotally supported on arms 67 and 68 which are in turn pivotally supported on the key frame 62.

The clerk keys 31 carry studs 69 cooperating with shoulder projections 70 on a detent bar 71 pivotally supported on arms (not shown) similar to the arms 67 and 68 supporting the detent bar 66.

When a clerk key 31 is depressed its stud 69 slides along the projection 70 moving the detent bar 71 downwardly until the stud is past the shoulder, whereupon a spring 72 restores the detent bar upwardly hooking the shouldered projection over the stud 69 to restrain this key in its depressed position.

Likewise depression of the transaction key 32 or the "no sale" key 33 carries its stud 63 or 64 past the shoulder on the associated projection 65 against tension of a spring 73 which spring immediately restores the detent bar to its normal position hooking the shoulder projection 65 over the stud 63 or 64 of the particular key depressed.

It will be noticed that the clerk keys 31 are longer than the transaction keys 32 and 33 and that the inner ends thereof are bent at right angles thereto, to form ears 45 on the inner end of the clerk keys. The purpose of this structure will be brought out fully later in the description of the differential mechanism associated with these keys.

The clerk and transaction keys are not released automatically near the end of each operation of the machine but remain depressed until another key in each group of keys is depressed. When another key in a group is depressed its stud merely shoves the detent bar downwardly releasing the previously depressed key and when fully depressed the detent bar is moved upwardly by its spring to hook the shoulder projection thereof over the stud on the newly depressed key thereby holding said key in its depressed position.

Means is provided to compel full depression of the transaction key before the machine may be released for operation. This means includes an ear 74 on the arm 67 supporting the upper end of the detent bar 66. When the transaction key is in either its undepressed position or its fully depressed position, the ear 74 occupies a position to the right of and clear of the path of a curved finger 80 fast on the release shaft 60 which, it will be remembered, rocks clockwise to release the machine for operation. If one of the transaction keys 32 or 33 is partially depressed the ear 74 is rocked into the path of the finger 80 and blocks the clockwise movement of the finger and of the shaft 60. When the key is fully depressed and the spring 73 moves the detent bar 66 upwardly to hook the projection 65 over the stud on the depressed key it rocks the arm 67 counterclockwise to remove the ear 74 from the path of the finger 80 freeing the shaft 60 for releasing movement.

The transaction keys 32 and 33 also cooperate with a control bar 81 (Fig. 15) swung on arms 82 and 83 and the clerk keys 31 cooperate with the control bar 84 swung on arms (not shown) but similar to the arms 82 and 83 supporting the control bar 81, to control the release of the machine for operation. The arms 82 (only one shown) supporting the upper ends of the detent bars 81 and 84 carry projections 85 normally resting in the path of a flat stud 86 projecting from an arm 87 (Fig. 5) fast on the release shaft 60. The projections 85 effectually prevent releasing movement of the shaft 60 until a key in each group is depressed. Springs 88 and 89 normally hold the control bars 81 and 84 respectively in their unoperated positions with the projections 85 in the path of the stud 86.

Depression of one of the clerks keys 31 or, of one of the transaction keys 32 or 33, engages its stud 69, 63 or 64, depending upon which of the keys is depressed, with its associated control bar 81 or 84 to shift these bars downwardly to remove the projections 85 from the path of the stud 86 thereby freeing the release shaft 60 for releasing movement.

*Key board—Item key*

The machine disclosed in the Shipley patents referred to above is organized to register both single item transactions or multiple item transactions. In that machine the item keys are located in the transaction bank, however, in the present machine the item key is located to the left of the main key board as is clearly illustrated in Fig. 1.

The purpose of the item key 34 (Figs. 1 and 11) is to control the machine to register the items of multiple item transactions, including a plurality of items, and taking the total thereof.

The item key is not used when registering a transaction comprising a single item. On such operations it is necessary to depress only the amount keys representing the amount of the transaction, a clerk key, a transaction key, and the release bar 36 to start the operation.

On multiple item operations, besides adding the several amounts into the selected transaction and clerk totalizers only, it is desired to accumulate the amounts of the several items on the item totalizer located on the upper totalizer line, so that after all of the items of the particular transaction have been registered the totals thereof may be printed and indicated.

The item totalizer is selected under the control of the item key 34 (Fig. 11) slidably mounted in a frame 90 supported by the cross rod 39 and by another rod (not shown). A stud 91 on the key 34 cooperates with a shouldered projection on a detent bar 92 slidably mounted on two studs 93, only one being shown herein.

Depression of the key 34, by its stud 91, shifts the detent bar 92 toward the right (Fig. 11) against the tension of a spring 94, which spring, as soon as the key 34 is fully depressed, restores the detent bar 92 to its normal position hooking the shouldered projection over the stud 91 to retain the key 34 in its depressed position.

Depression of the item key 34 (Fig. 11) also engages its stud 91 with an inclined edge of a bar 100 slidably mounted on the studs 93, and shifts the bar 100 toward the left as viewed in Fig. 11 to control the selection of the item totalizer in a manner to be described later.

When depressed, the item key 34 is not released at the end of each of the item entering operations comprising a multiple item transaction, but is retained in its depressed position until near the end of the total taking operation following the series of item entering operations of the multiple item transaction. The mechanism for so releasing the item key and for controlling the release of the item key is neither illustrated nor described herein. For a complete understanding of the item key releasing mechanism reference may be had to the above referred to Shipley and Brand patents.

When released by the mechanism disclosed in the above patents the item key is restored to its normal undepressed position by a spring (not shown herein).

Key board-total control lever

The total control lever 35 (Figs. 1 and 15) of the present application is well known in this type of machine and is similar in structure and operation to the total lever disclosed in Shipley's patent and in the Brand Patent No. 1,839,371. Its purpose, generally, is to condition the machine to take totals and sub-totals and to select the totalizer line from which the totalizer is selected under the control of the transaction or clerk keys from which the total or subtotal is to be taken.

The total lever 35 projects from a substantially circular control plate 101 (Fig. 15) journaled on a stud 102 projecting inwardly from the right side frame 41 of the machine.

A detail description of the mechanism operated by the total lever 35 is not included in this specification as it is not pertinent to the instant invention. Reference may be had to the above mentioned patents for a complete disclosure of the functions and operations of this mechanism.

Release mechanism

Figure 17:
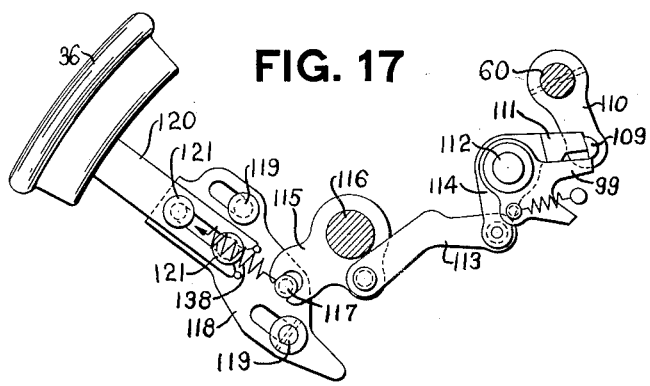
Fig. 17 is a detail view of the release bar and the mechanism whereby it releases the machine for operation.

After the desired amount keys 30, the clerk key 31, and the transaction key 32 or 33 have been depressed, the machine is released for operation by depressing the release bar 36 (Figs. 1, 16, and 17).

The release bar 36 and the mechanism operated thereby to release the machine for operation is old in the Shipley patents, however a brief description thereof will be included in this specification.

The release shaft 60 (Figs. 2, 5, 7, 16, and 17) is constantly urged to rock clockwise by a strong spring 103 (Fig. 16) compressed between the bottom of the slot 104 in a link 105, and the shoulder of a pair of spring pilots 106, one on each side of the link 105. The spring pilots 106 are mounted on a stud 107 projecting from an arm 108 fast on the shaft 60, the stud 107 projecting through the upper end of the slot 104.

The shaft 60 is normally held against clockwise rotation by the projections 85 on the arms 82 (Figs. 5 and 15) resting in the path of the stud 86 on the arm 87, which, as described above, is secured to the shaft 60. However, after a transaction key and a clerks key have been depressed removing the projections 85 from the path of the stud 87 the release shaft is still held against clockwise rotation by a stud 109 (Fig. 17) on an arm 110 fast on the shaft 60 resting against the end of a dog 111 pivoted on a stud 112 on the side frame 41.

A link 113 connects the downwardly extending arm 114 of the dog 111 with an arm 115 pivoted on a stud 116 also projecting from the frame 41. The arm 115 is bifurcated to embrace a stud 117 on plate 118 slidably mounted on studs 119 projecting from the frame 41. The stem 120 of the release bar 36 is removably mounted on studs 121 projecting from the plate 118.

Depression of the release bar 36 shoves the plate 118 downwardly and rocks the arm 115 counter-clockwise. The link 113 communicates this movement to the arm 114 rocking the dog 111 also counter-clockwise to remove the nose of the dog 111 from the path of the stud 109 thus freeing the shaft 60 for operation.

The spring 103 (Fig. 16) now expands and rocks the arm 108 and shaft 60 clockwise as viewed in Fig. 16, moving the stud 107 into the upper end of the slot 104 and moving the stud 109 (Fig. 17) between the dog 111 and a nonrepeat pawl 99 pivoted on the stud 112. This closes the circuit to an electric motor (not shown) and operates a clutch mechanism (also not shown) to operatively connect the motor to a main drive shaft 122 to operate the machine. The motor operates a shaft 122 two complete rotations in a clockwise direction, as viewed in Figs. 2, 5, 11, and 16, at each operation of the machine.

Near the end of the second rotation of the drive shaft 122 mechanism is operated to release the depressed amount keys and to bring the machine to a stop. This means includes a large gear 123 (Fig. 16) journaled on a stud 124 projecting from the frame 41. This gear meshes with a gear 130 fast on the shaft 122. The ratio of these gears is such that two rotations of the shaft 122 imparts one complete counter-clockwise rotation to the gear 123.

The machine may also be operated manually by a crank 125 (Fig. 16) journaled on a stud 126 projecting from the right side frame 41 of the machine. The crank 125 is secured to a gear 127 also mounted on the stud 126 which gear 127 meshes with the gear 123. The ratios of the gears 127 and 123 is such that four turns of the crank 125 and of the gear 127 are required to impart one clockwise rotation to the gear 123 and two clockwise rotations to the gear 130 and shaft 122.

A stud 131 (Fig. 16) on an arm 132 pivoted on a stud 133 on the frame 41, projects into a cam groove 134 in the face of the gear 123. A stud 135 on the free end of the arm 132 projects through a notch formed in the wall of an opening 136 in the link 105.

As the gear 123 rotates a portion 137 of the cam slot 134 engages the stud 131 and rocks the arm 132 clockwise and, by engagement of the stud 135 with the link 105, draws this link downwardly, rocking the arm 108 and shaft 60 counter-clockwise past normal position to engage the rod 58 (Fig. 2) with the tails 61 to release the depressed amount keys.

The gear 123 and cam slot 134 in this case differs with those disclosed in the patents referred to above in that heretofore the cam slot 134 was provided with two portions 137 thus stopping the machine and releasing the depressed keys when the gear 123 had completed one-half rotation and the gear 122 and main drive shaft had made but one rotation.

The shaft 60 also rocks the arm 110 (Figs. 16 and 17) counter-clockwise removing the stud 109 from between the dog 111 and the non-repeat pawl 99, whereupon a spring 138 restores the release bar 36 to its undepressed position and rocks the arm 115 clockwise positioning the dog 111 in the path of the stud 109. This movement of the shaft 60 also operates the clutch mechanism (not shown) to stop the machine and opens the electric circuit.

The portion 137 of the cam race 134 now raises the arm 132 shoving the link 105 upwardly to its normal position, but, since the dog 111 is now in the path of the stud 109, the arm 110, shaft 60, and arm 108 are held against clockwise movement. The upward movement of the link 105, therefore, compresses the spring 103 preparatory to another releasing movement of the shaft 60.

*Differential mechanism—Amount*

As the shaft 122 rotates it drives differential mechanism associated with the banks of amount keys and with the bank of transaction and clerk keys to add the amount on the totalizer and to select the totalizer onto which the amount is to be added. The differentials also set the indicators and type carriers (not shown). The differentials associated with the amount bank are all alike and are identical with the amount differentials disclosed in the patent to Fuller No. 1,242,170, and in the patent to Shipley No. 1,619,796, and for this reason but a brief description thereof is included in this specification.

The amounts differential includes a plurality of totalizer actuator racks 140, one for each of the totalizer lines. The actuator racks 140 are carried between a pair of substantially circular plates 141 secured together and pivoted on a stud 142 supported by a pair of hangers 143, only one of which is shown, the hangers being supported on cross rods 144 and 145 extending between the side frames 41 and 42 of the machine.

The plates 141 pivotally carrying a bell crank 150 and an arm 151 supporting between them a latch 152, a foot of which is held in engagement with a drive sector 153 by a spring 154. The drive sector 153 is operated by a pair of cams 155 and 156 fast on the drive shaft 122. These cams cooperate with rollers 157 and 158 respectively on a lever 159 pivoted on one of the hangers 143 and being connected at its upper end by a link 160 to the drive sector 153.

It will be remembered that the main drive shaft 122 is given two complete rotations at each operation of the machine, at each of which rotations the cams 155 and 156 rock the lever 159 first clockwise and then counter-clockwise to normal to rock the drive sector 153, by the connecting link 160, also clockwise then back to normal position.

On its clockwise travel the sector 153, by the latch 152 carries the totalizer actuator therewith until the forwardly extending arm of the bell crank 150 strikes the inner end of a depressed key, whereupon continued movement of the sector 153 rocks the bell crank 150 counter-clockwise withdrawing the latch from engagement with the sector and shoving the forward end of the latch into the proper one of a series of notches 161 on the inner edge of an arcuate bar 162 supported on the rod 145 and on the hanger 143.

If no key 30 is depressed the nose 163 of an arm 164 only a fragment of which is shown (see Fig. 2), pivoted on the stud 142, engages a zero stop arm 165 secured to the short shaft 56 previously described. The arm 164 being connected to the bell crank 150 by a stud 166, upon coming into contact with the stop arm 165 rocks the bell crank 150 to disconnect the latch 152 from the driver 153 thus stopping the differential in its zero position.

However, when a key 30 is depressed, it lowers the detent bar 44 and rocks the arm 51 clockwise, which, by the stud 57, rocks the arm 55 and shaft 56 counter-clockwise to move the stop arm 165 to its ineffective position. The differential may now travel upwardly to be disconnected, as above described, by the inner end of the depressed key.

On its counter-clockwise travel, the drive sector 153 picks up a stud 167 projecting laterally from the plates 141 and carries the differentially movable actuators 140 counter-clockwise to normal position.

Just before the actuators begin the return movement the selected totalizer or totalizers are engaged therewith and the return movement of the actuator adds thereon the amounts represented by the particular key 30 depressed.

Since the shaft 122 makes two rotations and the driver 153 makes two excursions at each operation of the machine obviously the differential is operated twice and adds the amount set up on the keyboard on the selected totalizers twice at each operation of the machine.

The totalizers on which the amount is added are selected under the control of the clerk keys 31 and transaction keys 32 and 33, the addition occurring first on the transaction totalizer and at the second cycle on the clerk totalizer.

The differential movement of the actuator rack 141 is transmitted to an indicator setting mechanism and is also utilized to set type wheels. The amount indicators and type wheels are not shown herein, but, the following mechanism is actuated by the differential associated with the amount banks to set them.

A beam 168 (Fig. 2) having its forward end pivotally supported on the differential member comprising the plates 141 is bifurcated at its rear end to straddle a stud 169 projecting from a long link 170. The upper end of the link 170 is pivotally connected to an indicator alining segment 171 secured to an end of one of a plurality of nested sleeves 172 surrounding a shaft 173 journaled in the frames 41 and 42. Integral with the segment 171 is an indicator setting segment 174 adapted to shift indicator carriers (not shown) to select the indicator appropriate to the particular key 30 depressed.

These indicators are fully disclosed in the above mentioned patents and it is not thought necessary to include a detail description of them in this specification.

When set, the indicator segment 171 is held by an aliner bar 180 mounted on a plurality of arms 181 only one of which is shown, fast on a shaft 182 supported in the side frames 41 and 42. The aliner shaft 182 is rocked at the proper time to disengage and then reengage the aliner 180 with the segment 171 by any suitable means preferably of the type shown in the patent to Shipley No. 1,619,796.

The lower end of the link 170 is pivotally connected to an arm 183 secured to one end of one of a group of nested sleeves 184 surrounding a shaft 185 journaled in the frames 41 and 42.

The sleeves 184 extend into the printer to set the type carriers according to the particular key 30 depressed.

To assist in setting the beam 168, the link 170 and the appertaining mechanism a roller 186 is mounted on the lever 159 so that after the forward end of the beam is set by the differential, the roller 186 contacts the lower edge of the beam and presses it against the stud 142 to insure proper and accurate setting of the indicator and the type wheels.

Differential-divided bank

The differential mechanism associated with the divided bank of clerks' and transaction keys is essentially the same as the transaction differential disclosed in the above mentioned Patents No. 1,242,170 and No. 1,619,796, the chief difference residing in the construction of the latch connecting the differentially movable arm with its drive sector.

The patents mentioned disclose but one bell crank to strike the depressed key thereby disconnecting the differential arm from the drive sector, whereas the illustrative embodiment of the present invention discloses a plurality of members adapted to strike the inner ends of the keys of the different groups to disconnect a single latch at a plurality of positions at each operation of the machine.

The clerk and transaction differential is operated by a pair of cams 187 and 188 (Fig. 5) fast on the main drive shaft 122. The cams are similar to the cams 155 and 156 (Fig. 2) for the amount differential and they cooperate with roller 189 and 190 respectively on a drive lever 191 pivoted on a hanger 192 supported on the cross rods 144 and 145. The hanger 192 together with a hanger 193 also supported on the cross rods 144 and 145 support the transaction differential in the machine.

A link 194 (Figs. 5 and 7) connects the upper end of the lever 191 with a drive sector 200 pivoted on a stud 201 supported in the hangers 192 and 193. A latch 203 pivotally supported on a differential arm 204 by a bell crank 205 (Figs. 8 and 9) and an arm 206, is normally held in engagement with the drive sector 200 by a spring 207 thereby connecting the differential arm 204 with the driver 200. The differential arm 204 is pivoted on the stud 201. The bell crank 205 is pivotally mounted on the hub 208 of a latch arm 209 pivoted on a stud 210 projecting from the differential arm 204 (see also Fig. 6). In its normal position the latch arm 209 rests on a lug 211 projecting laterally from the bell crank 205.

The arm 209 lies in the same plane with the stems of the transaction keys 32 and 33 so that as the driver 200 travels clockwise under the influence of the cams 187 and 188 it carries the differential arm 204 therewith until the arm 209 strikes the inner end of the depressed key 32 or 33. Continued clockwise movement of the sector 200, which is given an invariable movement, rocks the arm 209 counterclockwise about its pivot, and by the lug 211 rocks the bell crank 205 counter-clockwise to disconnect the latch 203 from the driver 200 at the same time shoving the forward end of the latch into the appropriate one of the series of notches 212 formed along the inner edge of an arcuate bar 213 supported on the rod 145 and by the hanger 193.

On its return movement the driver 200 picks up a stud 214 projecting from the differential arm 204 and restores this arm to its normal position.

As stated above, the main drive shaft 122 receives two complete rotations at each operation of the machine. It is at the first cycle of operation that the differential arm is stopped by the depressed transaction key 32 or 33 as just described.

At the beginning of the second cycle of operation the mechanism is operated to rock the arm 209 clockwise so that as the differential travels upwardly on the second cycle the arm 209 clears the inner end of the depressed key 32 or 33 and the differential continues its clockwise movement until the forwardly extending arm 215 of the bell crank 205 strikes the ear 45 of the depressed clerk key 31. The driver 200 at this time continues its clockwise travel rocking the bell crank 205 counter-clockwise to disconnect the latch as above described, entering the forward end of the latch 203 in its appropriate notch 212.

The driver 200 on its second counter-clockwise travel restores the differential arm 204 to normal position by the stud 214 just as on the first cycle.

The clockwise movement of the arm 209 is limited by a stud 216 (Figs. 6, 8, and 9) on the arm 204 projecting into a recess 217 in the end of the hub 208.

A stud 218 (Figs. 7, 8, and 9) on a projection 219 of the arm 209 normally rests just below and to the right of guide bar 220 concentric with the stud 201 and secured to the hanger 193. When the differential moves clockwise on the first cycle of operation the stud 218 moves upwardly to the right of the guide bar 220 and out of contact therewith, but on the second cycle of operation after the arm 209 has been rocked clockwise in a manner to be described later to the position in which it appears in Fig. 8, the stud 218 passes upwardly to the left of the guide bar 220 which serves to hold the arm 209 in its retracted position so that it will not strike the depressed transaction key 32 or 33. The mechanism for rocking the arm 209 to its ineffective position will now be described.

The stud 218 (Figs. 7, 8, and 9) projects through a large recess 221 in an arm 222 of a lever 223 pivoted on a stud 224 extending between the hangers 192 and 193 (see also Fig. 5). A link 230 connects the other arm 231 of the lever 223 with an arm 232 pivoted on a shaft 233 journaled in the frames 41 and 42. A spring 234 coiled about the shaft 233 yieldingly connects the arm 232 with a downwardly extending finger 235 fast on the shaft 233. The shaft 233 extends through the right side frame 41 where a bifurcated arm 236 (Figs. 10 and 16) fast thereon embraces a stud 237 in one arm 238 of the bell crank 239 (Fig. 10) pivoted on the stud 133. A stud 240 on the other arm 241 of the bell crank projects into a cam groove 242 in the rear face of the large gear 123.

That portion of the cam groove 242 (Fig. 10) which cooperates with the stud 240 during the first cycle of operation is concentric with the stud 124 and therefore does not displace the bell crank 239 or the shaft 233 on this cycle. The finger 235 (Fig. 7) holds the lever 223 in position in which it appears in Figs. 7 and 9 during the first cycle of operation. The stud 218 therefore moves upwardly to the right of the curved bar 220 on the first cycle and again enters the recess 221 in the arm 222 when restored by the clockwise movement of the driver 200.

At the beginning of the second cycle, however, the cam groove 242 rocks the bell crank 239 clockwise, rocking the arm 236, shaft 233 (Fig. 10) the finger 235 (Fig. 7) counter-clockwise, the arm 232 following, due to the spring 234. This movement by the link 230, rocks this lever 223 counter-clockwise and rocks the arm 209 clockwise to the position in which it appears in Fig. 8, carrying the stud 218 to the left of the guide bar 220. Now when the cams 187 and 188 operate the differential on the second cycle the stud 218, as before described, passes upwardly to the left of the guide bar 220. The lever 223 is held in the position it now occupies by the cam groove 242 so that, at the counter-clockwise movement of the differential, the stud 218 returning to its normal position again enters the recess 221 in the arm 222 on the lever 223. Near the end of the operation the cam groove 242 (Fig. 11) rocks the bell crank 239 counter-clockwise thereby rocking the arm 236 and the shaft 233 clockwise. This movement, by the finger 235 (Fig. 7) fast on the shaft 233, positively rocks the arm 232 in the same direction and by the link 230 rocks the lever 223 clockwise to replace the arm 209 in the position in which it appears in Fig. 9, and in which position the arm 209 is adapted to disconnect the latch under the influence of the transaction keys 32 and 33.

Thus it can be seen that at the first cycle of an adding operation the arm 209 (Fig. 7) is differentially positioned under the control of the transaction keys 32 or 33, the latch 203 being disconnected from the driver 200 by the arm 209. Also that, on the second cycle, the arm 204 is positioned under the control of the clerk keys 31, the latch 203 being disconnected from the driver at this cycle by the arm 215 of the bell crank 205.

*Indicators*

The differential movement of the arm 204 is transmitted to two sets of indicators to select on the first cycle the indicator corresponding to the depressed transaction key, and on the second cycle to select the indicator corresponding to the depressed clerk key.

The movement of the arm 204 is transmitted to the indicator by a beam 250 just like the beam 163 for the amount bank described above, and having its left-hand end, as viewed in Figs. 5 and 7, pivotally carried by the arm 204. The right hand end of the beam 250 is forked and straddles a stud 251 projecting from a link 252. The upper end of the link 252 is pivotally connected to an indicator alining and selecting segment 253 journaled on the shaft 173. The lower end of the link 252 is pivoted to the free end of an arm 254 journaled on one of the sleeves 184 surrounding the shaft 185. A yoke 255 connects the arm 254 with a segment 256 journaled on the shaft 185. The purpose of the segment 256 is to shift the totalizers laterally in the machine to select the proper one according to the particular keys 31 or 32 depressed in the divided bank. The mechanism for selecting the totalizers will be described later.

An indicator selecting and alining segment 257 (Figs. 5, 7, and 11) also pivoted on the shaft 173 is connected to the segment 253 by a spring 258 and a stud 259 projecting from the segment 253, the spring 258 normally pressing the stud 259 against a shoulder 260 on the segment 257.

Teeth 261 (Fig. 5) on the segment 257 mesh with a rack 262 on an indicator carrier 263 slidably supported on two channeled cross bars 264 and 265 supported in indicator frames 275 (only one being shown herein) secured to the side frames 41 and 42. The carrier 263 is divided into two parts one carrying five indicators 266 one for each of the transaction keys 32 or 33 to display the characters thereon towards the front of the machine, and the other carrying five indicators 267 to display the characters thereon toward the rear of the machine.

Likewise teeth 268 (Fig. 7) on the segment 253 mesh with a rack (not shown) on an indicator carrier 269 (Fig. 4) provided with two groups of four clerks indicators one for each of the clerks keys 31. One group 270 to indicate towards the front of the machine and the other group 271 to indicate towards the rear of the machine. The clerks indicator carrier 269 is also slidably mounted on the channeled cross bars 264 and 265.

It will be noted from inspection of Figs. 4 and 5 that the indicators 266 and 267 for the transaction keys are located to the rear of the compartments of the carrier 263 and that the indicators 270 and 271 for the clerks keys are located to the front of the compartments in their carrier 269. The reason for thus differently locating the indicators in their carriers is brought out later.

A link 272 (Fig. 7) connects the segment 257 to an arm 273 fast on the shaft 185. This shaft 185 and the sleeves or tubes 184 (Fig. 2) as described above, extend into the printing mechanism (not shown) to correspondingly set the type carriers (also not shown).

As the arm 204, on the first cycle of an adding operation is rocked clockwise it carries the left end of the beam 250 therewith differentially positioning this end of the beam according to the particular transaction key 32 or 33 depressed, the latch 203 being disconnected at the first cycle under the control of the transaction keys. The link 252 and the indicator setting and totalizer selecting mechanism is left standing at the end of an adding operation in the position to which these mechanisms were adjusted under the control of the particular clerk key 31 depressed on the last operation. The clerks keys are near the upper end of the bank, therefore the link 252 is left in its lower position.

As the cams 187 and 188 rock the lever 191 clockwise to advance the differential, a roller 274 (Fig. 5) on the lever 191 comes into contact with the lower edge of the beam 250 and continued movement of the lever 191 moves the beam against the stud 201 shoving the link 252 upwardly from the position in which it was left at the last operation to the transaction position corresponding to the particular transaction key 32 or 33 now depressed.

Just before the differential arm 204 is positioned as just described, the aliner bar 180 is disengaged from the segments 253 and 257 which are then positioned as above described. The aliner 180 is reengaged with the segments just after they are set.

The segment 253 is positioned directly by the link 252 and the spring 258 being of sufficient strength to overcome the friction of the segment 257 and its associated parts, carries this segment therewith, the segments maintaining the same relation with each other as that in which they appear in Figs. 5, 7, and 11. The movement of the segment 257 slides the transaction indicator carrier 263 rearwardly to select the proper indicator 266 and 267.

This movement of the segment 253 shifts the clerk indicator carrier 269 to a position corresponding to the particular transaction key depressed, but since as above described there are no clerks indicators 270 or 271 in the position corresponding to the transaction position nothing is indicated in the clerks position at the first cycle of operation. The proper transaction indicators 266 and 267 are selected and raised to their visible positions.

Any suitable means, preferably of the type disclosed in the patent to Shipley No. 1,619,796, may be employed to raise and lower the indicators.

The aliner 180 is now reengaged with the segments 253 and 257 and the differential arm 204 is then restored to its normal position leaving the segments 253 and 257 in their adjusted positions as determined by the particular transaction key 32 or 33 depressed.

It is desired to maintain the transaction indicators in the positions to which they were set on the first cycle throughout the second cycle so that the proper transaction indication will be displayed at the end of the operation. To do so a special aliner is provided to cooperate with the transaction indicator selecting and alining segment 257.

This special indicator aliner 280 (Figs. 5, 7, 10, 11, 14, and 16) is carried on an arm 281 pivoted on the shaft 182. A yoke 282 connects the arm 281 to an arm 283 also pivoted on the shaft 182, the arm 283 being connected to the arm 241 (see Fig. 10) of the bell crank 239 previously described, by a link 284.

It will be remembered that the cam groove 242 in the large gear 123 (Fig. 11) rocks the bell crank 239 clockwise at the beginning of the second cycle of operation and then counter-clockwise to normal just before the end of the second cycle of the operation.

The clockwise rotation of the bell crank 239 at the beginning of the second cycle, by the link 284, rocks the yoke arms 283 and 281 counter-clockwise to carry the aliner 280 into engagement with the transaction indicator selecting segment 257.

Just before the arm 204 (Figs. 5 and 7) is differentially positioned on the second cycle, of an adding operation, the indicator aliner 180 is again disengaged from the segments 253 and 257. The differential arm 204 is now positioned under the control of the depressed clerk key 31 moving the segment 253 farther clockwise than on the first cycle of operation to select the appropriate clerk indicators 170 and 171. The aliner 280 however, now being in engagement with the transaction indicator segment 257 maintains this segment, the transaction indicators and the transaction type carriers (not shown) in the positions to which they were moved at the first cycle of operation.

As the differential arm 204 now travelling upwardly on the second cycle of an adding operation, passes the point at which the latch 203 was disconnected on the preceding cycle, the upper edge of the beam 250 comes into contact with the stud 201 and continued movement of the arm 204, the latch arm 209 having been disabled early in the cycle, rotates the beam 250 clockwise around the stud 201 as a fulcrum. This action draws the link 252 downwardly rocking the segment 253 further clockwise until the latch 203 is disconnected by the arm 215 on the bell crank 205 striking the ear 45 of the depressed clerks key, thus shifting the clerks indicator carrier 269 (Fig. 4) to select the proper clerks indicators 270 and 271.

Figure 19:
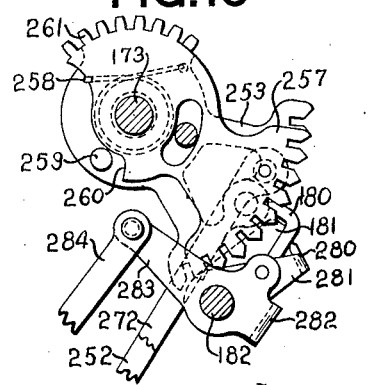
Fig. 19 is a detail view of the transaction and clerk indicator segment in moved position.

The aliner bar 180 is now reengaged with the segments 253 and 257 and hold both the segments and the indicator carrier 263 and 269 in their positions corresponding to the keys depressed in their respective groups. The segments 253 and 257 are shown in Fig. 19 in the positions they assume at an operation with the "E" clerks key and the "Chg" transaction key depressed.

An indicator aliner is provided to insure exact alinement of the indicator carriers in their adjusted positions. This aliner includes a universal alining bar 285 (Fig. 5) mounted on a pair of arms 286 (only one being shown) pivotally supported on the indicator frames 275. Links 287, only one shown, connect the arms 286 with the operating mechanism for aliner 180 so that this aliner and the aliner 285 are operated at the same time. The aliner bar 285 cooperates with a serrated bar 288 secured to the transaction indicator carrier 263 and also with a similar bar 289 secured to the clerks indicator carrier 267 to aline the carriers after they are set.

At the end of the operation the spring 258 (Figs. 5, 7, and 19) tends to draw the segments 253 and 257 together that is to rotate the segment 253 counter-clockwise and the segment 257 clockwise. The aliner 180 however restrains them until the machine is again operated.

When another operation is started the aliner 180 is disengaged from the segments 253 and 257 the spring 258 rotates the segment having the least friction, which in this case is the segment 257, until the shoulder 260 rests against the stud 259, the segment 253 being held, at the time by the comparatively greater friction of the totalizer selecting mechanism connected therewith by the link 252.

*Totalizer selecting mechanism*

It was described above how the single differential mechanism associated with the divided bank sets two indicating mechanisms by first setting the segment 257 through the segment 253 and spring 258, then alining the segment 257 in its selected position, after which, on the second cycle, the segment 253 was set to its selected position.

Two totalizers, a transaction totalizer and a clerk totalizer, are selected at each adding operation in a somewhat similar manner. However, since having the amount once added on the totalizer it is unnecessary to hold it in its shifted position, a spring connection such as 258, is not required.

The clerks and transaction totalizers are carried on separate lines, four clerks totalizers being carried on the front totalizer line and the four transaction totalizers on the back line. These totalizer lines are shiftable longitudinally in the machine to bring the selected totalizer opposite the actuator 140 (Fig. 2). The totalizer selecting mechanism and the manner of mounting and shifting the totalizers is substantially the same as that disclosed in the Shipley Patent No. 1,865,147. A brief description thereof will be given herein.

Each of the clerks totalizers includes a plurality of wheels 290 (Fig. 2) interspersed on a tube 292 securely mounted in a pair of arms 293 (Fig. 5) only one of which is shown herein. These arms are slidably mounted on a totalizer shaft 294 suitably supported in the machine as will be later described. The arms 293 are joined by a rod 300 forming therewith and with tubes 292 a totalizer frame adapted to be moved bodily toward the center of the machine for the purpose of engaging the selected clerks totalizer with the actuators 140. The upper ends of the arms 293 are bifurcated to embrace a projection on the hangers 192 and 193 to prevent rotation of the totalizer frame around the shaft 294 and to guide the frame when the totalizer is engaged and disengaged.

Figure 20:
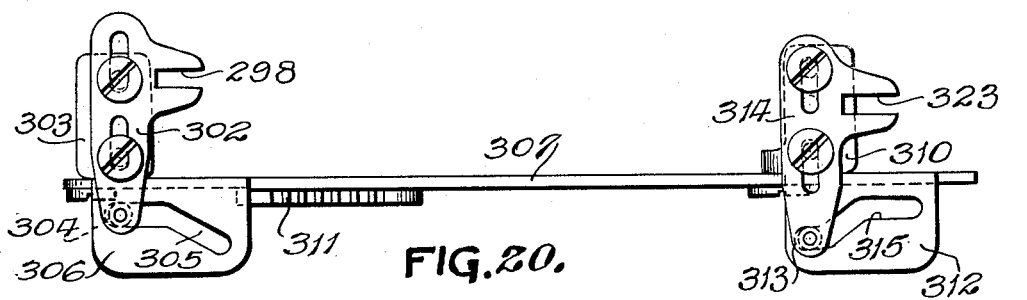
Fig. 20 is a detail top plan view of the totalizer shifting plates.

A tail 301 (Fig. 5) on the lower end of the arm 293 projects through a slot 298 (Fig. 20) in a shifting plate 302 slidable horizontally on a bracket 303 projecting upwardly from the base 43. A stud 304 projecting downwardly from the plate 302 engages a cam slot 305 (Figs. 3 and 20) in a cam 306 carried by a slide 307 mounted on a stud 308 in the bracket 303 and on a stud 309 in a bracket 310 projecting upwardly from the base 43 near the rear of the machine.

The segment 256, above described, meshes with a rack 311 secured to the side of the slide 307 to transmit the differential movement of the arm 204 by the beam 250, link 252, arm 254 the yoke 255 to the slide 307. The slide 307 is thereby shifted on the first cycle of operation to a position corresponding to that position in which the differential arm 204 is stopped by the particular transaction key 32 or 33 depressed.

Slide 307 also carries a cam 312 conveniently bent at right angles to the rear portion of the slide opposite the transaction totalizer and projecting horizontally therefrom. A stud 313 (see also Fig. 20) projecting downwardly from a plate 314 slidable horizontally on the bracket 310 is embraced by a cam slot 315 of the cam 312.

A tail 316 on one of a pair of totalizer arms 317 (Fig. 5) only one being shown mounted on a suitably supported shaft 318 projects through a slot 323 (Fig. 20), in the plate 314. The arms 317 are joined by a tube 319 on which are mounted the interspersed transaction totalizer wheels 320 (Fig. 2) and by a rod 321 thereby forming a totalizer frame slidable longitudinally on the shaft 318 to select the appropriate transaction totalizer. The transaction totalizer frame is movable bodily toward the center of the machine to engage the selected transaction totalizer with the actuator 140 associated therewith. This totalizer frame is bifurcated to embrace a guide 322 projecting from the hangers 192 and 193 to prevent pivotal movement of the frame about the shaft 318 and to guide said frame on its engaging and disengaging movements.

Assuming that an adding operation is to be made whereon clerk "E" registers a "charge" transaction. After depressing the requisite amount keys 30, the "E" clerk's key and the "charge" transaction key, the operator depresses the release bar 36 and the machine commences the operation.

On the first cycle of operation the differential arm 204 (Fig. 5) is stopped under the control of the depressed "charge" key, moving the link 252 downwardly thereby rotating the arm 254 and segment 256 clockwise to shift the slide 307 toward the front of the machine. This moves the cam slots 305 and 315 over their respective studs 304 and 313 to the "charge" position, as indicated by the word charge opposite these positions in Fig. 3.

It will be noticed that the "charge" position on the front or clerk totalizer line is marked blank, that is there is no totalizer in this position on the clerk totalizer line. However, a totalizer is provided in the "charge" position on the rear or transaction totalizer line. Therefore when the slide 307 with its cams 306 and 312, is shifted to the "charge" position the "charge" totalizer on the rear line is presented to the actuator 140 and the blank position is selected on the "clerk" totalizer line.

The amount set up on the amount keys is then added onto the selected transaction totalizer after which, near the end of the first cycle, the totalizer is disengaged from the actuators. The arm 204 returns to its normal position leaving the link 252 slide 307 and the front and rear totalizer lines standing in the "charge" position at the end of the first cycle.

On the second cycle the arm 209 (Figs. 8 and 9) is withdrawn and the differential, arm 204 continues beyond the depressed "charge" key and is stopped by the depressed "E" clerk key. This additional movement of the arm 204, by the beam 250 picks up the link 252 and shifts the slide 307 from its "charge" position to the "E" position sliding the cams 306 and 312 over the studs 304 and 313 respectively to the "E" clerk position.

Figure 3:
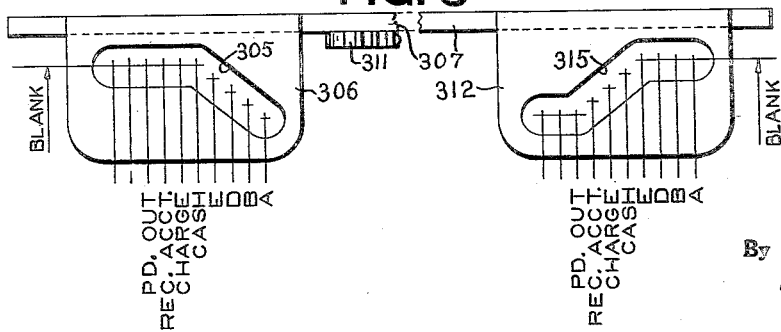
Fig. 3 is the fragmentary top plan view of the cam plates and slots for shifting the front and back totalizer lines.

It will be noticed by reference to Fig. 3, that the cam race 305 as the cam 306 moves to the "E" clerk position shifts the front or clerk totalizer line to select the "E" clerk totalizer. Also that the "E" position on the cam 312 for the transaction totalizer line is marked "blank" indicating that there is no totalizer on the transaction line in this position, consequently only the "E" clerk totalizer is selected on the second cycle of operation.

After this totalizer is selected in the second cycle of operation, the engaging mechanism operates to engage the selected clerks totalizers with the actuators 140 which on this restoring movement adds the amount set up on the key board on the "E" clerk totalizer.

*Totalizer engaging mechanism*

The totalizer engaging mechanism employed in the illustrative embodiment of the present invention is the same as that described in the patent to Fuller No. 1,242,170 and in the patent to Shipley No. 1,619,796. However, a brief description of this mechanism is included in this specification.

Rollers 330 and 331 (Figs. 11 and 18) on arms 332 and 333 respectively fast on the shafts 294 and 318 project into cam slots 334 and 335 in cam plates 336 and 337 secured to the inner side of the right side frames 41 of the machine. Another arm is fast on the opposite end of the shaft 294 and a roller (not shown) thereon projects into a cam slot in a cam plate (not shown) fast on the frame 42. Likewise the shaft 318 carries another arm (not shown) on its opposite end, which other arm carries a roller (not shown) projecting into a cam slot in a cam plate not shown.

These arms 332 and 333 with the rollers 330 and 331 hold the shafts 294 and 318 in radial slots 338 and 339 in their respective cam plates 336 and 337. A link 340 pivotally connected to the arm 332 carries a stud 341 adapted to be either in or out of a hook 342 on an engaging spider 343 pivoted on a stud 344 suitably supported in the machine. Likewise a stud 345 on a link 346 pivotally connected to the arm 333 is adapted to be either in or out of a hook 347 on the spider 343.

The spider 343 is rocked clockwise and then counterclockwise to normal twice during each adding operation of the machine, once on the first cycle and once on the second cycle. The mechanism for so rocking the spider includes a stud 355 on the spider 343 projecting into a notch in a pitman 356 having one end slidably supported on a stud 357 suitably supported in the machine and having its other end pivotally connected to a cam lever 358 pivoted on a stud 359 on the right side frame 41 of the machine.

Rollers 360 and 361 on the cam lever 358 co-operate with cams 362 and 363 respectively fast on the main drive shaft 122. This shaft makes two clockwise rotations as viewed in Fig. 18, at each operation of the machine, rocking the lever 358 at each operation first clockwise and then counter-clockwise to normal. This rocking movement is transmitted by the pitman 356 to the spider 343 rocking said spider first clockwise and then counter-clockwise to normal position at each cycle of operation to operate the totalizers engaging mechanism.

If one of the studs 341 or 345 (Fig. 18) is in its hook 342 or 347 the clockwise movement of the spider 343 draws the link 340 or 346 therewith rocking the arm 332 and shaft 394, or arm 333 and shaft 318 counter-clockwise, at which movement the roller 330 or 331 travelling in its slot 334 or 335 moves the associated totalizer frame radially toward the center of the machine to engage the selected totalizer with the actuators 140. The counter-clockwise movement of the spider 343 of course reverses this movement and disengages the totalizer.

*Totalizer engaging control*

It is desired to prevent engaging of the clerks totalizers when the machine is operated with certain of the transaction keys depressed.

For instance, it is not desired to accumulate the amounts of the paid out and no sale transactions, on the clerks totalizers as the amounts standing on these totalizers represent only the "Cash", "Charge" and "Received on Account" transactions.

To prevent engagement of the clerks totalizers at such transactions, the stud 341 (Fig. 11) is controlled to be out of its hook 342. However, it is desired to cause the engagement of the paid out totalizer during such operations. To cause the engagement of the paid out totalizer the stud 345 is controlled to be in its hook 347.

The mechanism for controlling the position of the studs 341 and 345 to cooperate with the hook 342 or 347 respectively will now be described.

A stud 364 (Fig. 11) on the link 340 projects into the reduced end of a large opening in a floating lever 365 pivoted on an arm 366 which in turn is pivoted on a stud 367 suitably supported in the machine.

Likewise a stud 368 on the link 346 projects into the reduced end of an opening in a floating lever 369 pivotally supported on the arm 370 pivoted on a stud 371.

The arms 366 and 370 are bifurcated to embrace the rounded ends of arms 372 and 373 projecting radially from a three armed lever 374 pivoted on the stud 344.

Springs 380 and 381 normally hold studs 382 and 383 on the floating levers 365 and 369 respectively in contact with the periphery of a selecting disk 384 also pivoted on the stud 344. A link 385 connects the selecting disk 384 with the transaction indicator setting and selecting segment 257.

It will be noted by examination of Fig. 11 that the selecting disk 384 is provided with high and low portions on its periphery opposite the studs 382 and 383. Opposite the stud 382 for the clerks totalizer in the normal position no sale and paid out positions the periphery of the disk is low while the received on account, charge and cash positions are high. Also opposite the stud 383 for the transaction totalizer in the normal and no sale positions the periphery is low while the paid out, received on account, charge, and cash positions are high.

A link 386 pivotally connected to the arm 370 in Fig. 11 at the point where the lever 369 is pivoted thereto, connects the arm 370 to a lever 387 pivoted on a stud 388. A stud 389 on the lever 387 projects into a cam groove 390 in a cam 391 fast on the main drive shaft 122.

At the beginning of each cycle of operation the cam groove 390 rocks the lever 387 counter-clockwise drawing the link 386 downwardly to rock the arm 370 clockwise. The arm 370 transmits this clockwise movement to the three-armed lever 374 rocking this lever counter-clockwise, thus rocking the arm 366 also clockwise.

Figure 18:
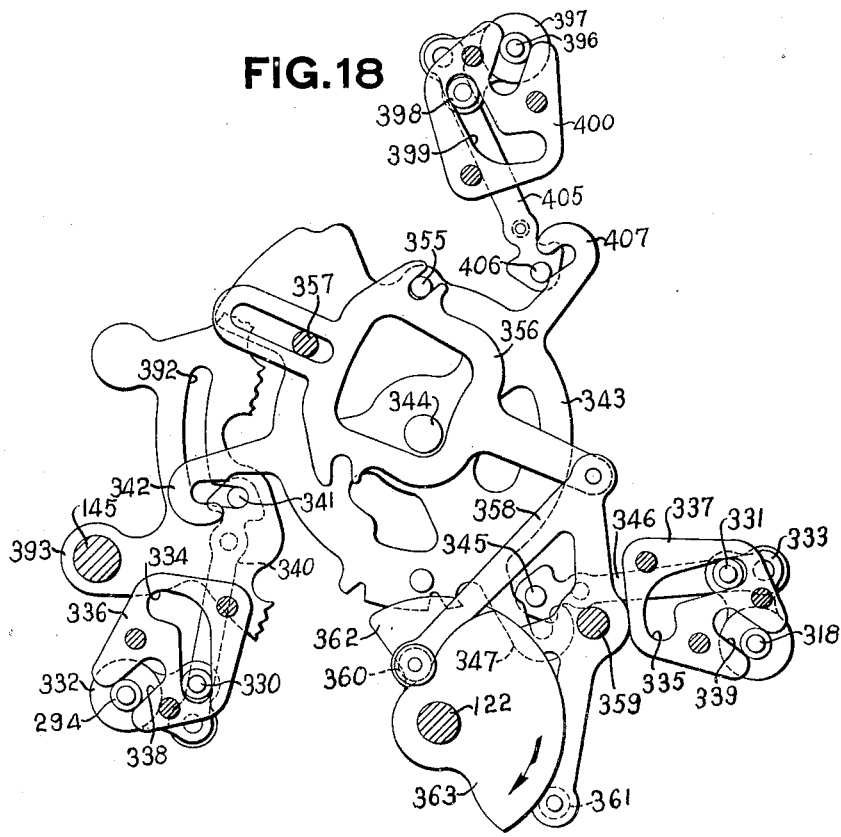
Fig. 18 is a detail view of the totalizer engaging mechanism.

If, at the last operation of the machine, the disk 384 was left standing with the low spot opposite one or both of the studs 382 or 383 the springs 380 and 381 holding these studs against the periphery of the disk 384 holds the studs 341 and 345 on the links 340 and 346 in the bottom of angular portions of slots 392 (only one of which is shown herein) in a hanger 393, a fragment only of which appears in Fig. 18, the hanger being supported on the cross rods 144 and 145.

Now, when the cam 391 rocks the arms 366 and 370 clockwise at the beginning of the first cycle, the levers 365 and 369 pivot on the studs 364 and 368 thus rocking the levers 365 and 369 counter-clockwise moving the studs 382 and 383 away from the periphery of the disk 384.

The differential arm 204 (Figs. 5 and 7) now operates to set the indicator segment 257 and by the link 385 sets the disk 384 according to the particular transaction key 32 or 33 depressed. If, when adjusting the disc, low spots are moved under the studs 382 or 383, the levers 365 or 369, when the cam 391 reverses the movement of the lever 387 and rocks the arms 366 and 370 counter-clockwise, again fulcrum on the studs 364 and 368. This replaces the studs 382 and 383 against the periphery of the disk 384 and permits the studs 341 and 345 on the links 340 and 346 to remain in the bottoms of their respective slots 392 and out of engagement with their respective hooks 342 and 347.

If, however, a high spot is moved beneath the stud 382 the lever 365, as the arm 366 rocks counter-clockwise fulcrums on the stud 382 resting on the high spot thus the stud 364 rocks the link 340 counter-clockwise moving the stud 341 into its hook 342 so that at the clockwise movement of the engaging spider 343 the selected clerks totalizer is engaged with the actuator 140.

The stud 345 on the link 346 for the transaction totalizer line is moved into its hook 347 in the same manner.

It was noted above that the "no sale" and the "paid out" positions on the disk 384 opposite the stud 382 are low spots. This is because it is not desired to engage the clerks totalizer on such transactions. Likewise the "no sale" position on the disk 384 opposite the stud 383 is a low position as it is not desired to engage the transaction totalizer on "no sale" operation. However it is desired to accumulate the amount of the "paid out" transactions on the "paid out" totalizer, for which reason the paid out position on the disk 384 opposite the stud 383 for the transaction totalizer lines is a high spot.

*Item totalizer selection*

The item totalizer is selected by depression of the item key 34 (Fig. 11). This key is depressed only when it is desired to accumulate the amount of a series of items, comprising a multiple item transaction, on the item totalizer so that when all of the items have been registered the total thereof may be cleared and printed thus obtaining the total of the particular multiple item transaction, at the same time accumulating the amounts on the proper clerks and transaction totalizers.

The means for selectively controlling the item totalizer is fully disclosed in Letters Patent of the United States No. 1,839,371, issued to Samuel Brand on January 5, 1932.

The item key 34 is depressed before a multiple item transaction and remains depressed throughout the several operations of the machine comprising a multiple item transaction. The machine of the Brand patent referred to above has but one cycle of operation at each adding operation but the machine of the present invention makes two adding cycles at each operation wherefore it is necessary to provide means to disable the item totalizer engaging means on one of the cycles while the item key remains depressed.

The item totalizer is engaged with the actuator 140 in exactly the same manner as the clerks and transaction totalizers.

The item totalizer wheels 394 (Fig. 2) are mounted on a tube 395, mounted in a pair of arms (not shown) like the arm 317 for the transaction totalizer. The item totalizer frame (not shown) is carried on a shaft 396 (Figs. 11 and 12) but since the one totalizer only is mounted on the tube 395, no means is provided to shift the totalizer frame laterally on the shaft 396. The shaft 396 carries an arm 397 at each end, only one of which is shown, having a roller 398 thereon, projecting into a cam slot 399 in a cam plate 400, secured to the right side frame 41. A link 405 pivoted to the arm 397 carries a stud 406 adapted to be either in or out of cooperative relation with a hook 407 on the engaging spider 343. A stud 408 on the link 405 projects through the reduced end of an opening in a lever 409, pivotally supported on an arm 410. This arm is pivoted on a stud 411, suitably supported in the machine, and is bifurcated to embrace the rounded end of the third arm 412 of the three-armed lever 374. A spring 413 normally holds a stud 414 on the lever 409 in contact with the periphery of the disk 384.

The disk 384 is not provided with high spots opposite the stud 414 as it is not desired to control the engagement of the item totalizer from the transaction keys. In place of the high spot on the periphery of the disk 384, an arm 415 pivoted on the stud 344 is adapted to be moved under the stud 414 by depression of the item key 34. The end of the arm 415 is the same distance from the center of the stud 344 as the radius of the high portion of the periphery of the disk 384. Therefore, when this arm is positioned under the stud 414, it accomplishes the same purpose as the high spot, that is, throwing the stud 406 into cooperative relation with its hook on the engaging spider.

Depression of the item key 34 engages its pin 91 with an inclined edge on the control bar 416, slidably supported on the stud 93 and on another stud not shown, and slides this bar toward the left. A link 417 connects the bar 416 to an arm 418 fast on a shaft 419 journaled in the machine side frames 41 and 42. A spring 420 flexibly connects an arm 421 (Figs. 11, 12, and 13) also fast on the shaft 419 with an arm 422, pivoted on the shaft 419, and a link 423 connects the arm 422 to the arm 415 (Fig. 11) described above.

When the key 34 (Fig. 11) is depressed, shifting the bar 416 toward the left, the link 417 rocks the arm 418, shaft 419, arm 421, and by the spring 420 rocks the arm 422 clockwise to lower the link 423. However, the stud 414 resting on the low periphery of the disk 384 blocks the clockwise movement of the arm 415 at this time so that the clockwise movement of the arm 421 merely tensions the spring 420. As soon as the operation commences, the cam 491 acting through the lever 387, link 386 and arm 370 rocks the three-armed lever 374 counter-clockwise. This rocks the arm 410 clockwise and, since the stud 406 is resting in the bottom of the slot (not shown) but the same as slot 392, the lever 409 is rocked counter-clockwise about the stud 408, raising the stud 414 away from the periphery of the disk 384. As soon as the stud 414 is clear of the arm 415, the spring 420 rocks the arm 422 clockwise, positioning the arm 415 under the stud 414. The clockwise movement of the arm 422 and consequently of the arm 415 is limited by a stud 424 (Fig. 12) projecting from the arm 421. The cam 391 now rocks the arm 410 counter-clockwise, turning the lever 409 clockwise on the stud 414 as a fulcrum, thereby shifting the stud 406 into cooperative relation with its hook 407 on the engaging spider 343.

The item totalizer is then engaged with the actuator 140 associated therewith and the amounts set up on the key board accumulate thereon during the first cycle, at the same time it is being added on the selected transaction totalizer. If the amount were again added on the item totalizer during the second cycle which is added on the clerks totalizer the purpose of the item totalizer would be destroyed and the total thereon would be useless.

Means is therefore provided to disable the item totalizer engaging means at the second cycle of adding operations. It will be remembered that the aliner 280 (Figs. 10 and 11) is operated at the beginning of the second cycle to hold the segments 257 against movement during this cycle. This movement of the aliner 280 is employed to disable the item totalizer engaging mechanism on the second cycle of operation.

A stud 425 on the upper end of a link 426 (Fig. 11) having its lower end pivoted to a projection on the arm 283, projects through a concentric slot 427 in the arm 422.

During the first cycle of an adding operation, when the stud 414 was moved to free the arm 415 the spring 420 rocked the arm 422 clockwise, positioning the lefthand end of the slot 427 near the stud 425. At the beginning of the second cycle the cam groove 242 (Fig. 10) rocks the aliner 280 counter-clockwise into engagement with the segment 257. This movement thrusts the link 426 upwardly, the stud 425 picking up the arm 422 and rocking it counter-clockwise to normal position, tensioning the spring 420 since the arm 421, shaft 419 and arm 418 are held against restoring movement by the pin 91 on the depressed item key 34.

The counter-clockwise movement of the arm 422, however, raises the link 423, rocking the arm 415 counter-clockwise to remove the arm from the path of the stud 414, the lever 409 having been rocked by the cams 391 to raise the stud 414 and remove the stud 406 from its hook 407 at the beginning of the second cycle. The cam 391 now rocks the arm 410 counter-clockwise again lowering the stud 414 to the lower periphery of the disk 384 permitting the stud 406 to rest out of cooperative relation with the hook 407 thus preventing engagement of the item totalizer at the second cycle of an adding operation.

*Totalizing operation*

The machine of the present invention functions on totalizing and sub-totalizing operations generally in the same manner as that of the Brand Patent No. 1,839,371 and the machine disclosed in the patents referred to above.

It is not thought necessary to include in this specification a detailed description of a totalizing operation or the mechanism for controlling the machine to make total and sub-total operations.

On adding operations, in order to release the machine for operation it is necessary to depress a key 31 and a key 32 or 33 in the provided bank. These keys control the selection of two totalizers, namely, the clerk's totalizer and the transaction totalizer. However, on total or sub-total taking operations it is possible to take a sub-total or a total from one totalizer only; therefore but one key in the divided bank may be depressed at the sub-total or total taking operation. For this reason it is necessary to couple the control bars 81 and 84 (Figs. 5 and 15) together, so that depression of any one of the clerks' keys 31 or the transaction keys 32 and 33 when depressed in combination with the release bar releases the machine for operation.

The means for coupling the control bars 81 and 84 includes a coupling pawl 430 (Fig. 15) pivoted on the control bar 84. A nose 431 of the pawl 430 is rocked into a notch 432 in the inner edge of the bar 81, when the total lever 35 is moved to any one of its total or sub-total positions except the item total position, which is the first position counter-clockwise from the add position.

A roller 433 on an arm 434 journaled on the cross rod 145 projects into a cam slot 435 in a cam plate 436 secured to the side of the control disk 101 from which the total lever 35 projects. A stud 437 on an arm 438 secured to the arm 434 projects through a slot 439 in the coupling pawl 430. A spring 440 normally holds the lefthand wall of the slot 439 against the stud 437.

Movement of the total control lever to any one of its sub-total positions or to the transaction total or clerk's total position rocks the arm 434 clockwise, removing the stud 437 from the lefthand wall of the slot 439, whereupon the spring 440 rocks the coupling pawl 430 counterclockwise to insert the nose 431 thereof into the notch 432, thus coupling the control bars 81 and 84 together, so that depression of any one of the keys 31, 32 or 33 shifts both bars in unison to remove the interlock 85 from the path of the stud 86. The machine may now be released by depressing the release bar 36.

It will be remembered that the latch arm 209, which cooperates with transaction keys 32 and 33, is rocked to its ineffective position at the beginning of the second cycle of operation. If a total is to be taken from a totalizer selected under control of one of the transaction keys 32 or 33, the differential would be stopped by the transaction key at the first cycle. On the second cycle the arm 209 is withdrawn and the differential would go to the ninth position since no key 31 is depressed.

To obviate this condition means is provided to prevent disabling the arm 209 on total or sub-total taking operations.

This device includes a stud 441 (Figs. 5 and 7) on a projection 442 of the arm 434 which stud 441 projects across the plane of a finger 443 extending rearwardly from the arm 232, but normally out of cooperative relation therewith.

Movement of the total lever 35 (Fig. 15) counter-clockwise to its "item total" position does not affect the arm 434 since the cam slot 435 is concentric with the pivot of the lever 35 to an extent equal to the movement of the lever from add to its item total position. When the lever 35 is moved further counter-clockwise, as viewed in Fig. 15, either to its "transaction total" or "clerk's total" position (Fig. 1) or clockwise to either its transaction sub-total or "clerk's sub-total" positions the slot 435 rocks the arm 434 clockwise positioning the stud 441 above the finger 443.

The shaft 233 is rocked counterclockwise at the beginning of the second cycle of all operations by the mechanism illustrated in Fig. 10, but with the stud 441 in the path of the finger 443, the arm 232 is blocked against counter-clockwise rotation and the finger 235 merely tensions the spring 234. The arm 232 and connecting link 230 hold the lever 223 against counter-clockwise movement, and as the differential goes up on the second cycle the stud 218 moves upwardly to the right of the guide bar 220 holding the arm 209 in its respective position whereby the differential is stopped by the depressed key 31, 32 or 33 at the second cycle.

If a clerk's key 31 is depressed, there is no key depressed in the lower group and the differential is stopped thereby at both cycles of operation by the arm 215 striking the ear 45 on the inner end of the depressed key.

When the total lever is restored to its adding position the cam slot 435 rocks the arm 434 counter-clockwise to its normal position, carrying the stud 441 out of the path of the finger 443.

*Indicator setting during total taking operations*

When taking a total of a "Multiple Item" transaction both the "Clerk's" and "Transaction" indicators are set in a manner identical to that in which they are set during adding operations. However, during all other total taking operations only one key in the control bank is depressed, and therefore, only one indicator is set during such total taking operations.

As above explained, when the total control lever is moved to the "Item Total" position it does not affect the arm 434 and, therefore, the arms 209 and 215 function just as during adding operations to control the positioning of the differential arm 204 differentially during each cycle of operation. This causes the differential arm 204 through beam 205, to set both indicator carrying frames during "Item Total" operations.

As explained above, during all total taking operations, except the "Item Total" operation, the differential arm 204 is set according to the depressed key 31, 32 or 33, during both cycles of operation. Since the differential arm 204 is set to the same position during both cycles of a total taking operation, only one indicator is selected during such operation. It is to be understood that both indicator carriers are set during such total taking operations, but one carrier is set into a position in which no indicator is brought into alinement with the indicator lifter. Thus when a key 31 is depressed a clerk's indicator is selected and lifted, and when a key 32 or 33 is depressed, a transaction indicator is selected and lifted.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

I claim:

1. In a machine of the class described; the combination with a bank of keys divided into two groups; and a differential arm adapted to make two excursions at each operation; of a plurality of latch operating members carried by the differential, one of said members being adapted to cooperate with the keys of one group at one excursion of the differential; and means to withdraw one of the members whereby the other member cooperates with the keys of the other group to stop the differential at the second excursion.

2. In a machine of the class described; the combination with a bank of keys divided into two groups; a differential arm; and means to drive the differential arm; of a latch to connect the differential with the driver; a latch arm pivotally carried on the differential to cooperate with the keys of one group; and a bell crank pivoted on the hub of the latch arm to cooperate with the keys of the other group.

3. In a machine of the class described; the combination with a bank of keys divided into two groups; a differential arm; and means to drive the differential arm; of a latch pivotally supported on the differential arm to connect said arm with the driver; a latch operating arm to disconnect the latch under control of one group of keys; a bell crank pivoted concentrically with the latch arm to disconnect the latch under control of the other group of keys; and a connection between the latch operating arm and the bell crank, whereby the bell crank is operated by the latch operating arm.

4. In a machine of the class described; the combination with a bank of keys divided into two groups; a differential arm; and means to drive the arm; of a latch arm pivotally supported on the differential arm to cooperate with one group of keys; a bell crank pivoted concentrically with the latch arm to support the differential arm and to cooperate with the other group of keys; and means to render the latch arm ineffective to cooperate with its group of keys.

5. In a machine of the class described adapted to make two cycles of operation; the combination with a bank of keys divided into two groups; a differential arm; and means to drive the differential arm; of a latch arm to cooperate with the keys of one group to disconnect the differential arm from the driving means at one cycle of operation; a bell crank to cooperate with the keys of the other group to disconnect the differential arm from the driving means at another cycle of operation; and means to render the latch arm ineffective to disconnect the differential from the driving means.

6. In a machine of the class described; the combination with a bank of keys divided into two groups; a differential arm; and means to drive said differential arm; of a latch arm pivotally supported on the differential arm to cooperate with one group of keys; a bell crank pivoted concentrically with the latch arm to support the differential arm and to cooperate with the other group of keys; means to render the latch arm ineffective to cooperate with its group of keys; and means to disable the last-named means on certain operations.

7. In a machine of the class described adapted to make two cycles of operation; the combination with a bank of keys divided into two groups; and a differential arm; and means to drive the differential arm; of a latch arm to cooperate with the keys of one group to disconnect the differential arm from the driving means at one cycle of operation; a bell crank to cooperate with the keys of the other group to disconnect the differential arm from its driving means at another cycle of operation; means to render the latch arm ineffective to disconnect the differential at another cycle; and means to control the last-named means to cause the latch arm to disconnect the differential arm from the driving means at both cycles of operation.

8. In a machine of the class described, adapted to make two cycles of operation; the combination with a bank of keys divided into two groups; a differential arm; means to drive the differential arm; and a latch normally connecting the differential arm with the driving means; of a latch arm to disconnect the latch from the driving means under control of one of the groups of keys at one cycle; a bell crank to support the latch and to disconnect the latch from the driving means under control of the other group of keys at the second cycle; means to rock the latch arm to render said arm ineffective; and means to prevent operation of the rocking means.

9. In a machine of the class described adapted to make two cycles of operation; the combination with a bank of keys divided into two groups; a differential arm; means to drive the differential arm; and a latch normally connecting the differential arm and the driving means; of a bell crank to pivotally support the latch on the differential arm, said bell crank being adapted to be rocked to disconnect the latch from the driving means, one arm of the bell crank adapted to cooperate with the keys of one group to rock the bell crank at one cycle of operation; a projection on the bell crank; and an arm to cooperate with the keys of the other group and with the projection to operate the latch at the other cycle of operation.

10. In a machine of the class described adapted to make two cycles of operation; the combination with a bank of keys divided into two groups; a differential arm; means to drive the differential arm; and a latch normally connecting the differential arm and the driving means; of a bell crank to support the latch, said bell crank being adapted to be rocked to disconnect the latch from the driving means, one arm of the bell crank adapted to cooperate with the keys of one group to operate the latch at one cycle; a projection on the bell crank; an arm to cooperate with the keys of the other group and with the projection to operate the latch at the other cycle of operation; and means to render the second mentioned arm ineffective to cooperate with the keys of its associated group and with the projection.

11. In a machine of the class described adapted to make two cycles of operation; the combination with a bank of keys divided into two groups; a differential arm; means to drive said arm; and a latch normally connecting the differential arm to the driving means; of a latch arm pivotally carried on the differential arm, the latch arm being adapted to be rocked in one direction to disconnect the differential arm from the driving means at one cycle of operation; and means to rock the latch arm in the opposite direction to render said latch arm ineffective to disconnect the differential arm from its driver at another cycle.

12. In a machine of the class described, adapted to make a plurality of cycles at an operation; the combination with a bank of keys divided into two groups; a differentially movable arm; means to drive said arm; and a latch normally connecting the differential arm with the driving means; of a latch arm pivotally carried on the differential arm, said latch arm being adapted to be rocked in one direction to disconnect the differential arm from the driving means; means to rock the latch arm in the other direction to render said latch arm ineffective to disconnect the differential arm from the driving means at another cycle; and means to restrain the latch arm in its ineffective position during said other cycle.

13. In a machine of the class described, adapted to make a plurality of cycles at an operation; the combination with a bank of keys divided into two groups; a differentially movable arm; means to drive the differential arm; and a latch normally connecting the differential arm with the driving means; of a plurality of means carried by the differential arm to disconnect the latch; and means to render one of said disconnecting means ineffective at one cycle of operation.

14. In a machine of the class described adapted to make a plurality of cycles at each operation; the combination with a bank of keys divided into two groups; a differential arm; means to drive said differential arm; and a latch normally connecting the differential arm with the driving means; of a plurality of means carried by the differential arm to disconnect the latch; means to disable one of said disconnecting means; and means to prevent operation of the disabling means at certain operations.

15. In a machine of the class described, adapted to make a plurality of cycles at each operation; the combination with a bank of keys divided into two groups; a differential arm; means to drive said differential arm; and a latch normally connecting the differential and the driving means; of a plurality of means carried by the differential arm to disconnect the latch; means to render one of said disconnecting means ineffective; and means to restrain said one disconnecting means in ineffective position during a certain cycle of operation.

16. In a machine of the class described, adapted to make a plurality of cycles at each operation; the combination with a bank of keys divided into two groups; a machine release element, releasable upon depression of a key in each group; a differential arm; means to drive the differential arm; and a latch normally connecting the differential arm with the driving means; of a plurality of means carried by the differential arm to disconnect the latch; means to render one of said disconnecting means ineffective at a certain cycle of certain operations; means to render the keys of both groups effective as a single group to release the machine release element; and means to render said one disconnecting means effective at all cycles of certain other operations.

17. In a machine of the class described, adapted to make a plurality of cycles at each operation; the combination with a bank of keys divided into two groups; a machine release element, releasable upon depression of a key in each group; a differential arm; means to drive the differential arm; and a latch normally connecting the differential arm with the driving means; of a plurality of means carried by the differential arm to disconnect the latch; means to render one of said disconnecting means ineffective at a certain cycle of certain operations; means to render the keys of both groups effective as a single group to release the machine release element; and manipulative means to render said one disconnecting means effective at all cycles of certain other operations.

18. In a machine of the class described, adapted to make a plurality of cycles at each operation; the combination with a bank of keys divided into two groups; a machine release element, releasable upon depression of a key in each group; a differential arm; means to drive the differential arm; and a latch normally connecting the differential arm and the driving means; of a plurality of means carried by the differential arm to disconnect the latch; means to render one of said disconnecting means ineffective at a certain cycle of certain operations; and manipulative means to render the keys of both groups effective as a single group to release the machine release element, and to render said one disconnecting means effective at all cycles of certain other operations.

19. In a machine of the class described, adapted to make adding and totalizing operations; the combination with a bank of keys normally divided into two groups; a machine release element, releasable upon depression of a key in each group; a differential arm adapted to make two excursions at each operation; means to drive said differential; and a latch normally connecting the differential arm and the driving means; of a plurality of means, one associated with each group of keys, carried by the differential to disconnect the latch under the control of the groups of keys at adding operations; means to render the keys of both groups effective to release the machine release element as a single group on totalizing operations; and means to render all of the disconnecting means effective to disconnect the latch under the control of any key in the bank at totalizing operations.

20. In a machine of the class described; the combination with a bank of keys normally divided into two groups; a machine release element, releasable upon depression of a key in each group; a differential arm adapted to make two excursions at each operation; means to drive the differential arm; and a latch normally connecting the differential arm and the driving means; of a latch arm to disconnect the latch under the control of the keys of one group at the first excursion; means to rock said arm to ineffective position; a bell crank to disconnect the latch under the control of the keys of the other group at the second excursion; means to control the machine to make totalizing operations; means operated by the control means to render the keys of both groups effective as a single group on totalizing operations to release the machine release element; and means operated by the control means to prevent rocking the latch arm whereby the latch is disconnected by the latch arm at both excursions of the differential arm on totalizing operations.

21. In a machine of the class described; the combination with a bank of keys divided into two groups; a differential arm adapted to make two excursions at each operation; means to drive the differential arm; and a latch to connect the differential arm with the driving means; a stud on the differential arm; a latch arm pivoted on the stud, said latch arm being adapted to cooperate with the keys of one group to disconnect the latch at the first excursion; a bell crank pivoted on the hub of the latch arm, the bell crank being adapted to cooperate with the keys on the other group to disconnect the latch at the second excursion; a stud on the latch arm; a lever having a bifurcated arm embracing the stud; and means to rock the lever to render the latch arm ineffective to disconnect the latch at the second excursion.

22. In a machine of the class described; the combination with a bank of keys divided into two groups; a differential arm adapted to make two excursions at each operation; means to drive the differential arm; and a latch normally connecting the differential arm with the driving means; of a plurality of means pivotally carried on the differential arm to disconnect the latch; a lever cooperating with the projection on one of said disconnecting means; and means to rock the lever to disable said one disconnecting means.

23. In a machine of the class described adapted to make a plurality of cycles at each operation; the combination with a bank of keys divided into two groups; a differential arm; and a plurality of groups of indicators; of means on the differential to stop said differential under control of one group of keys to set one group of indicators at one cycle of operation; means to render the stopping means ineffective at the second cycle; and other means on the differential arm to stop said differential under control of the keys of the other group to set another group of indicators at the second cycle.

24. In a machine of the class described adapted to make a plurality of cycles at each operation; the combination with a bank of keys divided into two groups; a differential arm; and a plurality of groups of indicators; of an arm pivoted on the differential to stop said differential under control of one group of keys to set one group of indicators at one cycle; means to rock the arm to ineffective position at the second cycle; and means pivoted on the differential arm to stop said differential arm under control of the keys of the other group to set another group of indicators at the second cycle.

25. In a machine of the class described adapted to make a plurality of cycles at each operation; the combination with a bank of keys divided into two groups; a differential arm; and a plurality of sets of indicators; of means on the differential arm to stop said differential arm under control of one group of keys to set one group of indicators at one cycle; means to render the stopping means ineffective at the second cycle; and a bell crank on the differential arm to stop said differential arm under control of the other group of keys to set another group of indicators at the second cycle.

26. In a machine of the class described adapted to make a plurality of cycles at each operation; the combination with a bank of keys divided into two groups; a differential arm; and a plurality of groups of indicators; of an arm pivoted on the differential arm to stop said differential arm under control of one group of keys to set one group of indicators at one cycle; means to rock the arm to ineffective position at the second cycle; and a bell crank pivoted on the differential arm to stop said differential arm under control of the other group of keys at the second cycle to set another group of indicators.

27. In a machine of the class described adapted to make a plurality of cycles at each operation; a bank of keys divided into two groups; a differential arm; and a plurality of groups of indicators adapted to be set by the differential arm; of means on the differential arm to stop said differential arm under control of the keys of one group at the first cycle to set one group of indicators; means to aline the indicators set at the first cycle; and other means on the differential arm to stop said differential arm under control of the keys of the second group to set another group of indicators at the second cycle.

28. In a machine of the class described adapted to make a plurality of cycles at each operation; the combination with a bank of keys divided into two groups; a differential arm; and a plurality of groups of indicators adapted to be set by the differential arm; of an arm pivoted on the differential arm to stop said differential arm under control of the keys of one of the groups to set one group of indicators at the first cycle; means to hold the indicators in the position to which they were set; means to rock the arm to ineffective position at the second cycle; and means pivoted on the differential arm to stop said differential arm under control of the other group of keys at the second cycle to set another group of indicators.

29. In a machine of the class described adapted to make a plurality of cycles at each operation; the combination with a bank of keys divided into two groups; a differential arm; and a plurality of groups of indicators adapted to be set by the differential arm; of means on the differential arm to stop said differential arm under the control of the keys of one of said groups to set one group of indicators at the first cycle; means to aline the indicators set at the first cycle; means to render the stopping means ineffective at the second cycle; and a bell crank on the differential arm to stop said differential arm under control of the keys of the second group to set another group of indicators at the second cycle.

30. In a machine of the class described adapted to make a plurality of cycles at each operation; the combination with a bank of keys divided into two groups; a differential arm; and a plurality of groups of indicators adapted to be set by the differential arm; of a latch arm pivoted on the differential arm to stop said differential arm under control of one of said groups of keys at the first cycle to set one group of indicators; means to aline the indicators set at the first cycle; means to rock the latch arm to ineffective position at the second cycle; and a bell crank pivoted on the differential arm to stop said differential arm under control of the other group of keys at the second cycle to control the setting of another group of indicators.

31. In a machine of the class described adapted to make a plurality of cycles at each operation; a bank of keys divided into two groups; a differential arm; and a plurality of groups of indicators adapted to be set by the differential arm; of means on the differential arm to stop said differential arm under control of the keys of one group at the first cycle to set one group of indicators; means to aline the indicators set at the first cycle; means to render the stopping means ineffective to stop the differential arm at the second cycle; other means on the differential arm to stop said differential arm under control of the keys of the second group to set another group of indicators at the second cycle; and other means to aline the indicators set at the first and second cycles.

32. In a machine of the class described adapted to make a plurality of cycles at each operation; the combination with a bank of keys divided into two groups; a differential arm; and a plurality of groups of indicators adapted to be set by the differential arm; of an arm pivoted on the differential arm to stop said differential arm under control of the keys of one of the groups to set one group of indicators at the first cycle; means to hold the indicators in the position to which they were set; means to rock the arm to ineffective position at the second cycle; means pivoted on the differential arm to stop said differential arm under control of the other group of keys at the second cycle to set another group of indicators; and other means to aline the indicators set at the first and second cycles.

33. In a machine of the class described adapted to make a plurality of cycles at each operation; the combination with a bank of keys divided into two groups; a differential arm; and a plurality of groups of indicators adapted to be set by the differential arm; of means on the differential arm to stop said differential arm under the control of the keys of one of said groups to set one group of indicators at the first cycle; means to aline the indicators set at the first cycle; means to render the stopping means ineffective at the second cycle; a bell crank on the differential arm to stop said differential arm under control of the keys of the second group to set another group of indicators at the second cycle; and other means to aline the indicators set at the first and second cycles.

34. In a machine of the class described adapted to make a plurality of cycles at each operation; the combination with a bank of keys divided into two groups; a differential arm; and a plurality of groups of indicators adapted to be set by the differential arm; of a latch arm pivoted on the differential arm to stop said differential arm under control of one of said groups of keys at the first cycle to set one group of indicators; means to aline the indicators set at the first cycle; means to rock the latch arm to ineffective position at the second cycle; a bell crank pivoted on the differential arm to stop said differential arm under control of the other group of keys at the second cycle to control the setting of another group of indicators; and other means to aline the indicators set at the first and second cycles.

35. In a machine of the class described; the combination with a bank of keys divided into two groups; a differential arm adapted to make two excursions at each operation; one of said excursions being under the control of one of the groups of keys and the other excursion being under control of the other group of keys; a plurality of groups of indicators; and means to condition the machine to make adding and totalizing operations; of means to set a different group of indicators at each excursion of the differential arm at adding operations; means operated by the conditioning means to render the groups of keys ineffective as a single group; and means controlled by the conditioning means to stop the differential arm at both excursions under the control of a single key in the single group at totalizing operations thereby setting a single group of indicators.

36. In a machine of the class described; the combination with a bank of keys divided into two groups; a differential arm; and means to condition the machine to make adding and totalizing operations; of a plurality of means on the differential arm to stop said differential arm in a plurality of key positions at adding operations; and means operated by the conditioning means to render the stopping means effective to stop the differential arm at a single key position at totalizing operations.

37. In a machine of the class described; the combination with a bank of keys divided into two groups; a differential arm; and means to condition the machine to make adding and totalizing operations; of a plurality of means on the differential arm to stop the arm under control of the groups of keys; and means operated by the conditioning means to cause the plurality of stopping means to operate as a single stopping means.

38. In a machine of the class described adapted to make two cycles at each operation; a bank of keys divided into two groups; a differential arm; means to drive the differential arm; and means to condition the machine to make adding and totalizing operations; of a latch arm to disconnect the differential arm from the driving means at one cycle; a bell crank to disconnect the differential arm from the driving means at the other cycle; means operated by the conditioning means to make the latch arm and bell crank function as a single stopping means.

39. In a machine of the class described adapted to make two cycles at each operation; the combination with a bank of keys divided into two groups; a differential arm; means to drive the differential arm; and means to condition the machine to make adding and totalizing operations; of a latch arm to disconnect the differential arm from the driving means at a certain key position at the first cycle; means to rock the latch arm to ineffective position; a bell crank to disconnect the differential arm from the driving means at another key position at the second cycle; and means operated by the conditioning means to disable the rocking means to form a single stopping means for the latch arm and bell crank to disconnect the differential arm at a single key position at both cycles of a totalizing operation.

40. In a machine of the class described; the combination of a bank of keys divided into two groups; a differential arm; two members carried by the differential, one member associated with each group of keys; means to render one member ineffective during a part of certain machine operations; and means to control the last-named means whereby both members remain effective during the entire operation of the machine.

41. In a machine of the class described, the combination with a bank of keys; a differential arm; means to drive the differential arm; and a latch to connect the arm and drive; of a latch operating arm; means to render the latch operating arm ineffective during certain operations; and means to disable the last named means on certain other operations.

SAMUEL BRAND.